United States Patent
Yamauchi

(10) Patent No.: US 10,833,314 B2
(45) Date of Patent: Nov. 10, 2020

(54) NEGATIVE ELECTRODE ACTIVE MATERIAL FOR ELECTRICITY STORAGE DEVICES

(71) Applicant: NIPPON ELECTRIC GLASS CO., LTD., Otsu (JP)

(72) Inventor: Hideo Yamauchi, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 4 days.

(21) Appl. No.: 15/580,302

(22) PCT Filed: Jul. 15, 2016

(86) PCT No.: PCT/JP2016/071033
§ 371 (c)(1),
(2) Date: Dec. 7, 2017

(87) PCT Pub. No.: WO2017/026228
PCT Pub. Date: Feb. 16, 2017

(65) Prior Publication Data
US 2018/0166683 A1  Jun. 14, 2018

(30) Foreign Application Priority Data

Aug. 11, 2015 (JP) ................................. 2015-158661
Nov. 24, 2015 (JP) ................................. 2015-228486

(51) Int. Cl.
| | |
|---|---|
| *H01M 4/131* | (2010.01) |
| *H01M 10/054* | (2010.01) |
| *H01G 11/46* | (2013.01) |
| *H01M 4/58* | (2010.01) |
| *H01M 4/136* | (2010.01) |
| *H01G 11/04* | (2013.01) |
| *H01M 10/0562* | (2010.01) |
| *H01M 4/02* | (2006.01) |

(52) U.S. Cl.
CPC ............ *H01M 4/131* (2013.01); *H01G 11/04* (2013.01); *H01G 11/46* (2013.01); *H01M 4/136* (2013.01); *H01M 4/5825* (2013.01); *H01M 10/054* (2013.01); *H01M 10/0562* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2004/0191617 A1* | 9/2004 | Visco | ................... H01M 2/1673 429/137 |
| 2009/0026413 A1 | 1/2009 | Patoux et al. | |
| 2011/0294020 A1 | 12/2011 | Kim et al. | |
| 2015/0333315 A1* | 11/2015 | Yoon | ...................... H01M 4/131 429/217 |
| 2016/0164082 A1 | 6/2016 | Yamauchi | |

FOREIGN PATENT DOCUMENTS

| | | | |
|---|---|---|---|
| JP | 2002-246025 A | | 8/2002 |
| JP | 2004-165018 A | | 6/2004 |
| JP | 2004165018 A | * | 6/2004 |
| JP | 2008-282665 A | | 11/2008 |
| JP | 2009-531265 A | | 9/2009 |
| JP | 2012-503293 A | | 2/2012 |
| JP | 2012-054208 A | | 3/2012 |
| JP | 2014-089836 A | | 5/2014 |
| JP | 2014089836 A | * | 5/2014 |
| JP | 2014-192133 A | | 10/2014 |
| JP | 2015-035290 A | | 2/2015 |
| KR | 10-2015-0129534 A | | 11/2015 |

OTHER PUBLICATIONS

Kawamura, Ryoto, et al. "Microstructure Observation and Electrical Conductivities of Proton-Conducting TiO2-P2O5 Glass-Ceramic Solid Electrolytes." Phosphorus Research Bulletin, vol. 28, 2013, pp. 24-29., doi:10.3363/prb.28.24. (Year: 2013).*
Espacenet Machine Translation of JP 2014-089836 (Year: 2019).*
Espacenet Machine Translation of JP 2004-165018 (Year: 2019).*
"LiTiPO5 (LiTi[PO4]O Orth) Crystal Structure." SpringerMaterials, 2016, https://materials.springer.com/isp/crystallographic/docs/sd_1403913. (Year: 2016).*

(Continued)

*Primary Examiner* — Ladan Mohaddes

(74) *Attorney, Agent, or Firm* — Keating and Bennett, LLP

(57) ABSTRACT

Provided is a negative-electrode active material for electricity storage devices that has a low operating potential, can increase the operating voltages of the electricity storage devices, and has excellent cycle characteristics. The negative-electrode active material for electricity storage devices, the negative-electrode active material containing a crystalline phase represented by a general formula $R_{x1}R'_{x2}MA_yO_z$ (where R represents at least one selected from Li, Na, and K, R' represents at least one selected from Mg, Ca, Sr, Ba, and Zn, M represents at least one selected from Ti, V, and Nb, A represents at least one selected from P, Si, B, and Al, $0 \leq x1 \leq 6$, $0 \leq x2 \leq 6$, $0 < y \leq 12$, and $0.2 \leq z \leq 87$, but a case where x1=0.5 and x2=0 and a case where x1=1.5 and x2=0 are excluded).

14 Claims, 4 Drawing Sheets

(56) References Cited

OTHER PUBLICATIONS

Official Communication issued in International Patent Application No. PCT/JP2016/071033, dated Oct. 11, 2016.
The Electrochemical Society, "Abstract #137", 223rd ESC Meeting, 2013, 1 page.
Official Communication issued in corresponding Chinese Patent Application No. 201680047054.0, dated Apr. 1, 2020.
"Preparation and research on the modification of lithium battery negative materials, Chapter IV Preparation and research on the electro-chemical property of LiTiOPO4", Chinese Master's Theses Full-text Database Engineering Science and Technology II, ISSN 1674-0246 CN 11-9144/G, 2014, 16 pages.

* cited by examiner

[FIG. 1]
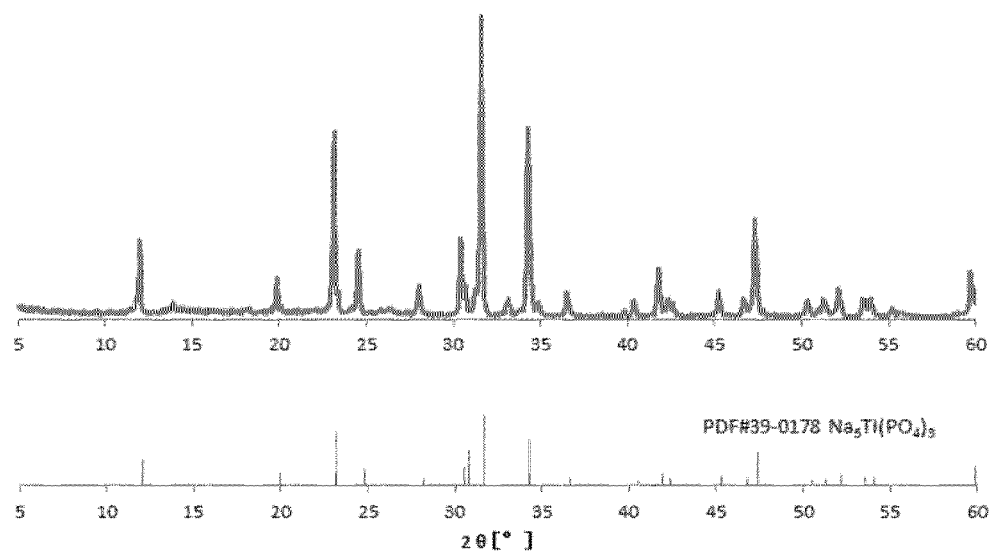
[FIG. 2]
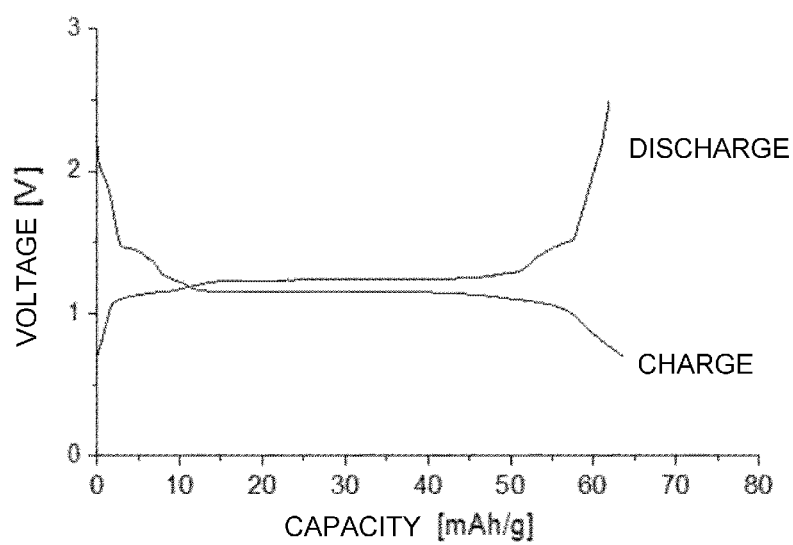

[FIG. 3]
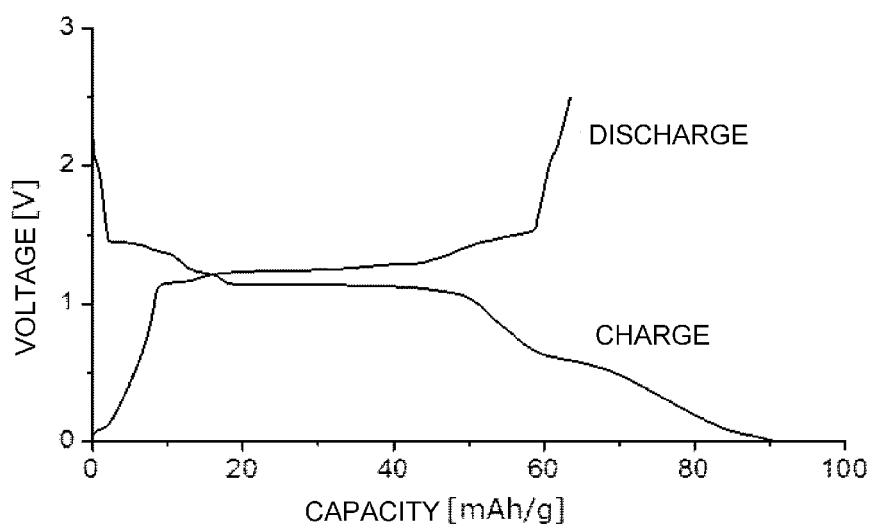
[FIG. 4]
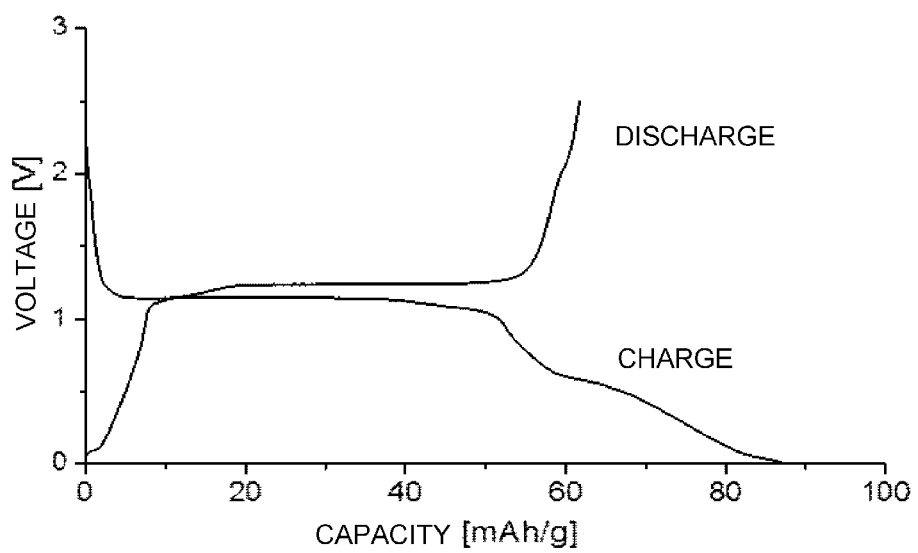

[FIG. 5]
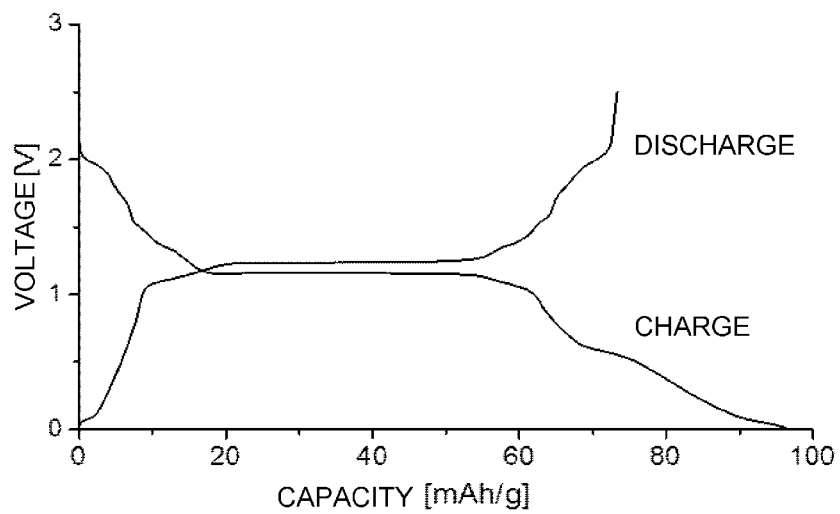
[FIG. 6]
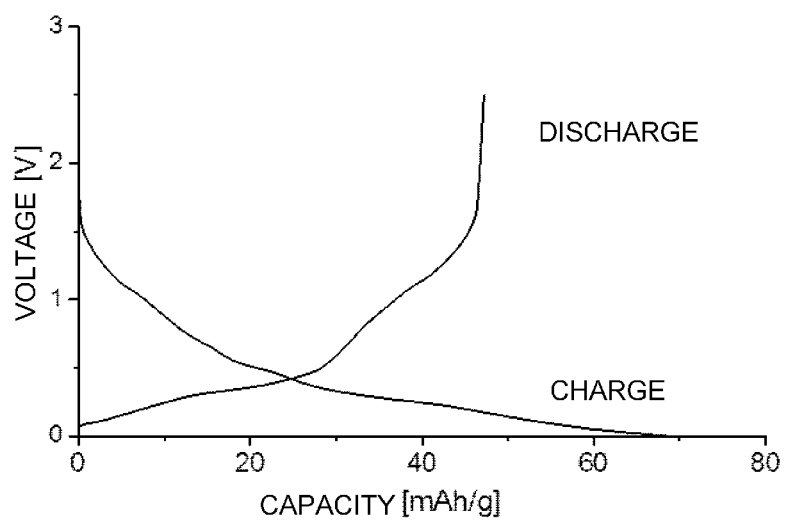

[FIG. 7]
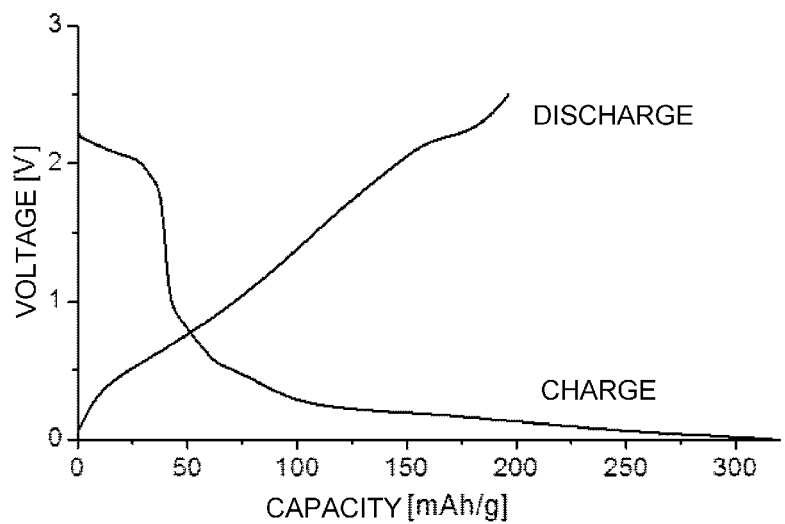
[FIG. 8]
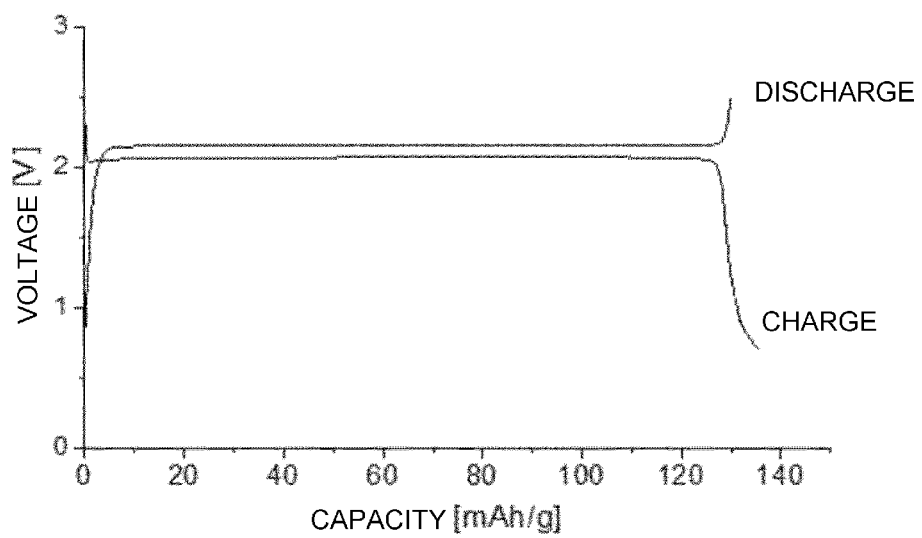

NEGATIVE ELECTRODE ACTIVE MATERIAL FOR ELECTRICITY STORAGE DEVICES

TECHNICAL FIELD

The present invention relates to negative-electrode active materials for use in electricity storage devices, such as a lithium-ion secondary battery, a sodium-ion secondary battery, and a hybrid capacitor, for use in portable electronic devices, electric vehicles, electric power tools, backup emergency power supplies, and so on.

BACKGROUND ART

Recently, with the widespread use of portable electronic devices, electric vehicles, and so on, developments of electricity storage devices, including lithium-ion secondary batteries and sodium-ion secondary batteries, have been advanced. Materials containing Si or Sn having a high theoretical capacity are being studied as negative-electrode active materials for use in electricity storage devices. However, with the use of a negative-electrode active material containing Si or Sn, the negative-electrode active material exhibits a large volume change due to expansion and contraction thereof occurring during insertion/extraction reaction of lithium ions or sodium ions, which presents a problem that the collapse of the negative-electrode active material due to repeated charge and discharge is significant and, therefore, the cycle characteristics are likely to decrease.

To cope with this, $NaTi_2(PO_4)_3$ and $Na_3Ti_2(PO_4)_3$, which are NASICON-type compounds, are proposed as negative-electrode active materials having relatively good cycle characteristics (see, for example, Patent Literature 1 and Non-Patent Literature 1).

CITATION LIST

Patent Literature

Patent Literature 1: JP-A 2012-54208

Non-Patent Literature

Non-Patent Literature 1: Abstract #137, 223rd ECS Meeting, 2013 The Electrochemical Society

SUMMARY OF INVENTION

Technical Problem

The operating voltage of an electricity storage device is determined by the difference between the operating voltage of the positive electrode and the operating voltage of the negative electrode and becomes larger as the operating voltage of the negative electrode decreases. When $NaTi_2(PO_4)_3$ or $Na_3Ti_2(PO_4)_3$ is used as the negative-electrode active material for the electricity storage device, the $Ti^{4+}/Ti^{3+}$ reaction potential is very high, 2.2 V (vs. $Na/Na^+$), so that the operating voltage of the negative electrode becomes high, which presents a problem that the operating voltage of the electricity storage device where this negative-electrode active material is used becomes small.

In view of the above circumstances, the present invention has an object of providing a negative-electrode active material for electricity storage devices that has a low operating potential, can increase the operating voltages of the electricity storage devices, and has excellent cycle characteristics.

Solution to Problem

The inventor conducted intensive studies and, as a result, found that the above problem can be solved by a negative-electrode active material containing a crystalline phase of a specific composition.

Specifically, a negative-electrode active material for electricity storage devices according to the present invention contains a crystalline phase represented by a general formula $R_{x1}R'_{x2}M A_y O_z$ (where R represents at least one selected from Li, Na, and K, R' represents at least one selected from Mg, Ca, Sr, Ba, and Zn, M represents at least one selected from Ti, V, and Nb, A represents at least one selected from P, Si, B, and Al, $0 \le x1 \le 6$, $0 \le x2 \le 6$, $0 < y \le 12$, and $0.2 \le z \le 87$, but a case where x1=0.5 and x2=0 and a case where x1=1.5 and x2=0 are excluded).

The negative-electrode active material for electricity storage devices according to the present invention preferably contains a crystalline phase represented by a general formula $R_x TiP_y O_z$ (where R represents at least one selected from Li, Na, and K, $0.5 < x \le 6$, $0.25 \le y \le 4$, and $2.5 \le z \le 16$, but a case where x=1.5 is excluded).

In the negative-electrode active material for electricity storage devices according to the present invention, the crystalline phase represented by the general formula $R_x TiP_y O_z$ is preferably at least one selected from $R_4 TiP_2 O_9$, $R_5 TiP_3 O_{12}$, $R_3 TiP_2 O_{8.5}$, $R_{3.91} TiP_2 O_9$, $RTiP_{1.67} O_{6.67}$, $R_2 TiP_2 O_8$, $RTiP_{1.5} O_6$, $RTiP_2 O_7$, and $RTiPO_5$.

The negative-electrode active material for electricity storage devices according to the present invention is preferably formed of a composition containing, in terms of % by mole of oxide, 0 to 70% $R_2 O$, 0 to 70% R'O, 1 to 80% $TiO_2 + V_2 O_5 + Nb_2 O_5$, and 5 to 70% $P_2 O_5 + SiO_2 + B_2 O_3 + Al_2 O_3$. Note that "$TiO_2 + V_2 O_5 + Nb_2 O_5$" means a total of contents of $TiO_2$, $V_2 O_5$, and $Nb_2 O_5$, and "$P_2 O_5 + SiO_2 + B_2 O_3 + Al_2 O_3$" means a total of contents of $P_2 O_5$, $SiO_2$, and $B_2 O_3$.

The negative-electrode active material for electricity storage devices according to the present invention preferably has a content of the crystalline phase of 50% by mass or more.

The negative-electrode active material for electricity storage devices is suitable for use in a sodium-ion secondary battery.

A negative electrode material for electricity storage devices according to the present invention contains the above-described negative-electrode active material for electricity storage devices.

Advantageous Effects of Invention

The present invention enables provision of a negative-electrode active material for electricity storage devices that has a low operating potential, can increase the operating voltages of the electricity storage devices, and has excellent cycle characteristics.

BRIEF DESCRIPTION OF DRAWINGS

FIG. 1 is a chart showing an XRD (X-ray diffraction) pattern of sample No. 1 which is a working example.

FIG. 2 is a graph showing first charge/discharge curves of a test cell for a sodium-ion secondary battery in which sample No. 1 as a working example is used.

FIG. 3 is a graph showing first charge/discharge curves of a test cell for a sodium-ion secondary battery in which sample No. 15 as a working example is used.

FIG. 4 is a graph showing first charge/discharge curves of a test cell for a sodium-ion secondary battery in which sample No. 18 as a working example is used.

FIG. 5 is a graph showing first charge/discharge curves of a test cell for a sodium-ion secondary battery in which sample No. 20 as a working example is used.

FIG. 6 is a graph showing first charge/discharge curves of a test cell for a sodium-ion secondary battery in which sample No. 22 as a working example is used.

FIG. 7 is a graph showing first charge/discharge curves of a test cell for a sodium-ion secondary battery in which sample No. 24 as a working example is used.

FIG. 8 is a graph showing first charge/discharge curves of a test cell for a sodium-ion secondary battery in which sample No. 37 as a comparative example is used.

DESCRIPTION OF EMBODIMENTS

A negative-electrode active material for electricity storage devices according to the present invention contains a crystalline phase represented by a general formula $R_{x1}R'_{x2}MA_yO_z$ (where R represents at least one selected from Li, Na, and K, R' represents at least one selected from Mg, Ca, Sr, Ba, and Zn, M represents at least one selected from Ti, V, and Nb, A represents at least one selected from P, Si, B, and Al, $0 \leq x1 \leq 6$, $0 \leq x2 \leq 6$, $0 < y \leq 12$, and $0.2 \leq z \leq 87$, but a case where $x1=0.5$ and $x2=0$ and a case where $x1=1.5$ and $x2=0$ are excluded).

R is a component for increasing the alkali-ion conductivity. The negative-electrode active material for electricity storage devices according to the present invention inserts and extracts alkali ions with charge and discharge, but some alkali ions may remain inserted in the negative-electrode active material without being extracted. The remaining alkali ions lead to an irreversible capacity and cause a decrease in first discharge capacity. To cope with this, an R component is previously contained in the negative-electrode active material, which makes it difficult for alkali ions to be absorbed into the negative-electrode active material during the first charge and thus enables the first discharge capacity to increase. The range of values of x1 is preferably $0 \leq x1 \leq 6$, more preferably $0.5 \leq x1 \leq 6$, still more preferably $1 \leq x1 \leq 5.8$, yet still more preferably $2 \leq x1 \leq 5.7$, yet still more preferably $3 \leq x1 \leq 5.6$, yet still more preferably $4 \leq x1 \leq 5.5$, and particularly preferably $5 \leq x1 \leq 5.4$, (but a case where $x1=0.5$ and $x2=0$ and a case where $x1=1.5$ and $x2=0$ are excluded). If x1 is too large, other crystals containing an alkali ion (for example, $Li_3PO_4$, $Na_4P_2O_7$ or $NaPO_4$) are formed in large amounts, so that the cycle characteristics are likely to decrease. Furthermore, the content of the active material components relatively decreases, so that the discharge capacity tends to decrease.

Li, Na, and K may be singly contained as R in the negative-electrode active material. Among them, Na and K present as plentiful resources are preferred and Na having a small atomic weight is particularly preferred because it can relatively increase the content of active material components. When during charge and discharge of the electricity storage device, ions inserted from or extracted to the positive electrode through the electrolyte are lithium ions, the active material preferably contains Li. When these ions are sodium ions, the active material preferably contains Na. When these ions are potassium ions, the active material preferably contains K.

R' is a component for stabilizing the crystal structure. Furthermore, like R, R' has the effect of making it difficult for alkali ions to be absorbed into the negative-electrode active material during the first charge and thus increasing the first charge/discharge efficiency. The range of values of x2 is preferably $0 \leq x2 \leq 6$, more preferably $0 \leq x2 \leq 5$, still more preferably $0 \leq x2 \leq 4$, yet still more preferably $0 \leq x2 \leq 3$, yet still more preferably $0.1 \leq x2 \leq 3$, yet still more preferably $0.1 \leq x2 \leq 2$, and particularly preferably $0.1 \leq x2 \leq 1.5$. If x2 is too large, other crystals containing an alkaline-earth metal ion (for example, $BaB_2O_4$) are formed in large amounts, so that the cycle characteristics are likely to decrease. Furthermore, the content of the active material components relatively decreases, so that the discharge capacity tends to decrease. Mg, Ca, Sr, Ba, and Zn may be singly contained as R' in the negative-electrode active material. Among them, Mg, Ca, and Sr present as plentiful resources are preferred and Mg and Ca having a small atomic weight are particularly preferred because they can relatively increase the content of active material components.

M is an active material component serving as sites where alkali ions are inserted and extracted. Ti, V, and Nb may be singly contained as M in the negative-electrode active material. Among them, Ti and Nb present as plentiful resources are preferred and Ti is particularly preferred. The content of Ti in M is, in % by mole, preferably 70% or more, more preferably 80% or more, and particularly preferably 95% or more.

A is at least one selected from P, Si, B, and Al and has excellent alkali-ion conductivity and the effect of increasing the cycle characteristics. The range of values of y is preferably $0 < y \leq 12$, more preferably $0.1 \leq y \leq 8$, still more preferably $0.25 \leq y \leq 4$, yet still more preferably $1 \leq y \leq 3.8$, yet still more preferably $1.5 \leq y \leq 3.6$, yet still more preferably $2 \leq y \leq 3.4$, and particularly preferably $3 \leq y \leq 3.2$. If y is too small, the alkali-ion conductivity tends to decrease and the cycle characteristics tend to decrease. On the other hand, if y is too large, the discharge capacity is likely to decrease. P, Si, B, and Al may be singly contained as A in the negative-electrode active material. Among them, Si and P present as plentiful resources are preferred and P having excellent alkali-ion conductivity is particularly preferred.

The range of values of z is preferably $0.2 \leq z \leq 87$, more preferably $1 \leq z \leq 50$, still more preferably $2 \leq z \leq 30$, yet still more preferably $2.5 \leq z \leq 16$, yet still more preferably $3 \leq z \leq 15$, yet still more preferably $4 \leq z \leq 14$, yet still more preferably $6 \leq z \leq 13$, and particularly preferably $9 \leq z \leq 12$. If z is too small, Ti is reduced to decrease the valence, so that the redox reaction accompanying charge and discharge becomes less likely to occur. As a result, the amount of alkali ions inserted and extracted is reduced, so that the capacity of the electricity storage device tends to decrease. On the other hand, if z is too large, the content of the active material components relatively decreases, so that the discharge capacity tends to decrease.

The negative-electrode active material for electricity storage devices according to the present invention preferably contains a crystalline phase represented by a general formula $R_xTiP_yO_z$ (where R represents at least one selected from Li, Na, and K, $0.5 < x \leq 6$, $0.25 \leq y \leq 4$, and $2.5 \leq z \leq 16$, but a case where $x=1.5$ is excluded).

The range of values of x is preferably $0.5 \leq x \leq 6$, more preferably $1 \leq x \leq 5.8$, still more preferably $2 \leq x \leq 5.7$, yet still more preferably $3 \leq x \leq 5.6$, yet still more preferably $4 \leq x \leq 5.5$, and particularly preferably $5 \leq x \leq 5.4$, (but a case where $x=1.5$ is excluded). If x is too small, the alkali-ion conductivity decreases, so that the resistance tends to increase and the discharge voltage tends to increase. Furthermore, alkali ions are likely to be absorbed in the negative-electrode active material during the first charge, so that the first charge/discharge efficiency is likely to decrease. On the other hand, if x is too large, other crystals made of an alkali ion and $P_2O_5$ (for example, $Li_3PO_4$, $Na_4P_2O_7$ or $NaPO_4$) are formed in large amounts, so that the cycle characteristics are likely to decrease. Furthermore, the content of the active material components relatively decreases, so that the discharge capacity tends to decrease.

The range of values of y is preferably $0.25 \leq y \leq 4$, more preferably $1 \leq y \leq 3.8$, still more preferably $1.5 \leq y \leq 3.6$, yet still more preferably $2 \leq y \leq 3.4$, and particularly preferably $3 \leq y \leq 3.2$. If y is too small, the alkali-ion conductivity tends to decrease and the cycle characteristics tend to decrease. On the other hand, if y is too large, the water resistance is likely to decrease, so that when an aqueous electrode paste is prepared, undesirable other crystals are likely to be produced. As a result, the $P_2O_5$ network in the negative-electrode active material is broken, so that the cycle characteristics are likely to decrease.

The range of values of z is preferably $2.5 \leq z \leq 16$, more preferably $3 \leq z \leq 15$, still more preferably $4 \geq z \leq 14$, yet still more preferably $6 \geq z \leq 13$, and particularly preferably $9 \leq z \leq 12$. If z is too small, Ti is reduced to decrease the valence, so that the redox reaction accompanying charge and discharge becomes less likely to occur. As a result, the amount of alkali ions inserted and extracted is reduced, so that the capacity of the electricity storage device tends to decrease. On the other hand, if z is too large, other crystals containing $P_2O_5$ (for example, $Li_3PO_4$, $Na_4P_2O_7$ or $NaPO_4$) are formed in large amounts, so that the cycle characteristics are likely to decrease. Furthermore, the content of the active material components relatively decreases, so that the discharge capacity tends to decrease.

Preferred as a crystalline phase represented by the general formula $R_xTiP_yO_z$ is at least one selected from $R_4TiP_2O_9$ [$R_4TiO(PO_4)_2$], $R_5TiP_3O_{12}$[$R_5Ti(PO_4)_3$], $R_3TiP_2O_{8.5}$[$R_6(TiO)Ti(PO_4)_4$], $R_{3.91}TiP_2O_9$[$R_{3.91}TiO(PO_4)_2$], $RTiP_{1.67}O_{6.67}$[$R_3Ti_3(PO_4)_5$], $R_2TiP_2O_8$[$R_2Ti(PO_4)_2$], $RTiP_{1.5}O_6$[$R_2Ti_2(PO_4)_3$], $RTiP_2O_7$, and $RTiPO_5$[$RTiOPO_4$] (where the characters in [ ] represent a rational formula). These crystalline phases can decrease the redox potential of $Ti^{4+}/Ti^{3+}$ due to charge and discharge to about 1.2 V (vs. Na/Na$^+$) and have small voltage variations due to charge and discharge to make it easy to provide a constant operating voltage. Among the above specific crystalline phases, those containing, as R, Na plentiful as a resource are preferred, $Na_{3.91}(TiP_2O_9)$, $Na_4TiP_2O_9$, and $Na_5TiP_3O_{12}$ are particularly preferred, and $Na_5TiP_3O_{12}$ having excellent ion conductivity is most preferred. Note that $Na_{3.91}TiP_2O_9$ and $Na_4TiP_2O_9$ are monoclinic crystals and belong to space group P2$_1$/c. Furthermore, $Na_5TiP_3O_{12}$ is a hexagonal crystal and belongs to space group R32.

The presence of crystalline phases in the negative-electrode active material can be confirmed by powder X-ray diffraction measurement. For example, when the negative-electrode active material contains a crystalline phase of $Na_4TiO(PO_4)_2$, the X-ray diffraction measurement using CuKα rays shows that there are characteristic peaks in the vicinity of $2\theta=11.4°$, 11.7°, 18.0°, 18.3°, 25.8°, 26.3°, 27.9°, 28.2°, 33.1°, 33.8°, and 34.8°. Furthermore, when the negative-electrode active material of the present invention contains a crystalline phase of $Na_5TiO(PO_4)_3$, the X-ray diffraction measurement using CuKα rays shows that there are characteristic peaks in the vicinity of $2\theta=12.0°$, 19.9°, 23.1°, 24.6°, 30.4°, 31.6°, 34.3°, 41.7°, 47.3°, 47.4°, 59.7°, and 62.3°. Note that because the crystal lattice slightly changes depending on the material composition or the like, the above peak positions may vary somewhat. Therefore, each peak position encompasses a range of ±0.5° of that value.

As the proportion of crystalline phases in the negative-electrode active material increases, the redox potential of $Ti^{4+}/Ti^{3+}$ contained in the crystal is more likely to be constant and variations of the charge and discharge voltages are more likely to be restrained. Specifically, the content of crystalline phases in the negative-electrode active material is, in % by mass, preferably 50% or more, more preferably 60% or more, still more preferably 70% or more, yet still more preferably 80% or more, yet still more preferably 90% or more, yet still more preferably 95% or more, and particularly preferably 99% or more.

The negative-electrode active material for electricity storage devices may contain an amorphous phase. The amorphous phase has excellent alkali-ion conductivity and, therefore, facilitates insertion and extraction of alkali ions due to charge and discharge. As a result, the redox potential decreases and the operating voltage of the negative electrode can be decreased. Furthermore, when the negative-electrode active material for electricity storage devices according to the present invention is used in an all-solid-state secondary battery, an amorphous phase is likely to exist at the interface between the negative-electrode active material and the solid electrolyte. The amorphous phase serves as a conducting path for alkali ions and therefore decreases the interfacial resistance between the active material crystal and the solid electrolyte, so that the discharge capacity and discharge voltage of the electricity storage device are likely to increase. Furthermore, the cycle characteristics are likely to increase. Moreover, because the amorphous phase acts as a binder, the adhesive strength between the negative electrode layer and the solid electrolyte layer is increased.

The content of the amorphous phase is, in % by mass, preferably 0.1% or more, more preferably 1% or more, still more preferably 3% or more, and particularly preferably 5% or more. However, if its content is too large, the proportion of crystalline phases relatively decreases and, therefore, the above effects are less likely to be achieved. Hence, the content of amorphous phase is, in % by mass, preferably not more than 50%, more preferably not more than 40%, still more preferably not more than 30%, yet still more preferably not more than 20%, and particularly preferably not more than 10%. If the content of amorphous phase is too large, the redox potential of $Ti^{4+}/Ti^{3+}$ contained in the crystal tends to be non-constant and variations of the charge and discharge voltages tend to be large.

The contents of crystalline phase and amorphous phase in the negative-electrode active material can be determined by using a diffraction line profile at 2θ values of 10 to 60° obtained by powder X-ray diffraction measurement using CuKα rays and making a peak separation from the profile into crystalline diffraction lines and an amorphous halo. Specifically, the background is subtracted from the diffraction line profile to obtain a total scattering curve, a broad diffraction curve (amorphous halo) at 10 to 45° is peak-separated from the total scattering curve and integrated, the obtained integrated intensity of the halo is represented as Ia, crystalline diffraction lines of a desired crystalline phase detected at 10 to 60° are peak-separated from the total scattering curve and integrated, the sum of the obtained integrated intensities of the crystalline diffraction lines is represented as Ic, and the sum of integrated intensities determined from the other crystalline diffraction lines is represented as Io. In this case, the content Xc of crystalline phase and the content Xa of amorphous phase are determined from the following equations.

$$Xc=[Ic/(Ia+Ic+Io)]\times 100(\%)$$

$$Xa=[Ia/(Ia+Ic+Io)]\times 100(\%)$$

The negative-electrode active material for electricity storage devices according to the present invention preferably contains, in terms of % by mole of oxide, 0 to 70% $R_2O$ (where R represents at least one selected from Li, Na, and K), 0 to 70% R'O (where R' represents at least one selected from Mg, Ca, Sr, Ba, and Zn), 1 to 80% $TiO_2+V_2O_5+Nb_2O_5$, and 5 to 70% $P_2O_5+SiO_2+B_2O_3+Al_2O_3$. Reasons why each of the components is limited in this manner will be described below. Note that in the description of the content of each component "%" refers to "% by mole" unless otherwise stated.

$R_2O$ is a component for increasing the alkali-ion conductivity. The negative-electrode active material for electricity storage devices according to the present invention inserts and extracts alkali ions with charge and discharge, but some alkali ions may remain inserted in the negative-electrode active material without being extracted. The remaining alkali ions lead to an irreversible capacity and cause a decrease in first discharge capacity. To cope with this, an $R_2O$ component is previously contained in the negative-electrode active material, which makes it difficult for alkali ions to be absorbed into the negative-electrode active material during the first charge and thus enables the first discharge capacity to increase. The content of $R_2O$ is preferably 0 to 70%, more preferably 1 to 70%, still more preferably 15 to 70%, yet still more preferably 20 to 65%, yet still more preferably 29 to 60%, yet still more preferably 31 to 58%, and particularly preferably 40 to 55%. If the content of $R_2O$ is too small, the alkali-ion conductivity decreases, so that the resistance tends to increase and the discharge voltage tends to increase. Furthermore, alkali ions are likely to be absorbed in the negative-electrode active material during the first charge, so that the first charge/discharge efficiency is likely to decrease. On the other hand, if the content of $R_2O$ is too large, other crystals made of an alkali ion and $P_2O_5$ (for example, $Li_3PO_4$, $Na_4P_2O_7$ or $NaPO_4$) are formed in large amounts, so that the cycle characteristics are likely to decrease. Furthermore, the content of the active material components relatively decreases, so that the discharge capacity tends to decrease. The content of each component of $Li_2O$, $Na_2O$, and $K_2O$ is preferably 0 to 70%, more preferably 1 to 70%, still more preferably 15 to 70%, yet still more preferably 20 to 65%, yet still more preferably 29 to 60%, yet still more preferably 31 to 58%, and particularly preferably 40 to 55%.

$Li_2O$, $Na_2O$, and $K_2O$ may be singly contained in the negative-electrode active material. Among them, $Na_2O$ and $K_2O$ present as plentiful resources are preferred and $Na_2O$ having a small atomic weight is particularly preferred because it can relatively increase the content of active material components. When during charge and discharge in the electricity storage device, ions inserted from or extracted to the positive electrode through the electrolyte are lithium ions, the active material preferably contains $Li_2O$. When these ions are sodium ions, the active material preferably contains $Na_2O$. When these ions are potassium ions, the active material preferably contains $K_2O$.

R'O is a component for stabilizing the crystal structure. Furthermore, like $R_2O$, R'O has the effect of making it difficult for alkali ions to be absorbed into the negative-electrode active material during the first charge and thus increasing the first charge/discharge efficiency. The content of R'O is preferably 0 to 70%, more preferably 0 to 60%, still more preferably 0 to 50%, yet still more preferably 0 to 40%, yet still more preferably 0.1 to 30%, yet still more preferably 0.5 to 25%, and particularly preferably 5 to 20%. If the content of R'O is too small, the discharge voltage tends to increase. Furthermore, alkali ions are likely to be absorbed in the negative-electrode active material during the first charge, so that the first charge/discharge efficiency is likely to decrease. On the other hand, if the content of R'O is too large, other crystals (for example, $BaB_2O_4$) are formed in large amounts, so that the cycle characteristics are likely to decrease. Furthermore, the content of the active material components relatively decreases, so that the discharge capacity tends to decrease. The content of each component of MgO, CaO, SrO, BaO, and ZnO is preferably 0 to 70%, more preferably 0 to 60%, still more preferably 0 to 50%, yet still more preferably 0 to 40%, yet still more preferably 0.1 to 30%, yet still more preferably 0.5 to 25%, and particularly preferably 5 to 20%. MgO, CaO, SrO, BaO, and ZnO may be singly contained in the negative-electrode active material. Among them, MgO, CaO, and SrO present as plentiful resources are preferred and MgO and CaO having a small atomic weight are particularly preferred because they can relatively increase the content of active material components.

$TiO_2$, $V_2O_5$, and $Nb_2O_5$ are active material components serving as sites where alkali ions are inserted and extracted. The content of $TiO_2$, $V_2O_5$, and $Nb_2O_5$ is, in total, preferably 1 to 80%, more preferably 1 to 70%, still more preferably 1 to 59%, yet still more preferably 5 to 49%, yet still more preferably 10 to 39%, yet still more preferably 12 to 29%, and particularly preferably 15 to 27%. If the content of $TiO_2$, $V_2O_5$, and $Nb_2O_5$ is too small, the discharge capacity per unit mass of the negative-electrode active material tends to be small and the charge/discharge efficiency during the first charge and discharge tends to decrease. On the other hand, if the content of $TiO_2$, $V_2O_5$, and $Nb_2O_5$ is too large, the volume change due to insertion and extraction of alkali ions during charge and discharge is large, so that the cycle characteristics tend to decrease. The content of each component of $TiO_2$, $V_2O_5$, and $Nb_2O_5$ is preferably 0 to 80%, more preferably 1 to 80%, still more preferably 1 to 70%, yet still more preferably 1 to 59%, yet still more preferably 5 to 49%, yet still more preferably 10 to 39%, yet still more preferably 12 to 29%, and particularly preferably 15 to 27%.

$P_2O_5$ has excellent alkali-ion conductivity and the effect of increasing the cycle characteristics. $SiO_2$, $B_2O_3$, and $Al_2O_3$, like $P_2O_5$, have excellent alkali-ion conductivity and the effect of increasing the cycle characteristics. The content of $P_2O_5+SiO_2+B_2O_3+Al_2O_3$ is preferably 5 to 70%, more preferably 15 to 70%, still more preferably 17 to 60%, yet still more preferably 20 to 40%, and particularly preferably 25 to 35%. If the content of $P_2O_5+SiO_2+B_2O_3+Al_2O_3$ is too small, the above effects are less likely to be achieved. On the other hand, if the content of $P_2O_5+SiO_2+B_2O_3+Al_2O_3$ is too large, the discharge capacity is likely to decrease.

The content of $P_2O_5$ is preferably 5 to 70%, more preferably 15 to 70%, still more preferably 17 to 60%, yet still more preferably 20 to 40%, and particularly preferably 25 to 35%. If the content of $P_2O_5$ is too small, the above effects are less likely to be achieved. On the other hand, if the content of $P_2O_5$ is too large, the water resistance is likely to decrease, so that when an aqueous electrode paste is prepared, undesirable other crystals are likely to be produced. As a result, the $P_2O_5$ network in the negative-electrode active material is broken, so that the cycle characteristics are likely to decrease. The content of each of $SiO_2$, $B_2O_3$, and $Al_2O_3$ is preferably 0 to 70%, more preferably 1 to 50%, still more preferably 3 to 40%, yet still more preferably 5 to 35%, and particularly preferably 7 to 30%. If the content of $SiO_2$, $B_2O_3$ or $Al_2O_3$ is too large, the discharge capacity is likely to decrease. Particularly, if the content of $B_2O_3$ is too large, the chemical durability is likely to decrease.

The molar ratio between the contents of $TiO_2$ and $P_2O_5$ ($TiO_2/P_2O_5$) is preferably 0.2 to 3, more preferably 0.2 to 1.5, still more preferably 0.3 to 1.3, yet still more preferably 0.4 to 1.2, and particularly preferably 0.5 to 1.1. If $TiO_2/P_2O_5$ is too small, the amount of active material component becomes small, so that the discharge capacity tends to decrease. Furthermore, alkali ions inserted during the first charge are likely to be absorbed in the negative-electrode active material, so that the first charge/discharge efficiency tends to decrease. On the other hand, if $TiO_2/P_2O_5$ is too large, this results in an inability to reduce the volume change of Ti ions due to charge and discharge, so that the cycle characteristics tend to decrease.

The molar ratio between the contents of $R_2O$ and $P_2O_5$ ($R_2O/P_2O_5$) is preferably 0.4 to 2.5, more preferably 0.5 to 2.3, still more preferably 1.0 to 2.2, and particularly preferably 1.5 to 2.1. If $R_2O/P_2O_5$ is too small, the ion conductivity decreases, so that the redox potential due to charge and discharge tends to increase. On the other hand, if $R_2O/P_2O_5$ is too large, this results in an inability to reduce the volume change of Ti ions due to charge and discharge, so that the cycle characteristics tend to decrease.

The molar ratio between the contents of $TiO_2+V_2O_5+Nb_2O_5$ and $P_2O_5+SiO_2+B_2O_3+Al_2O_3$ (($TiO_2+V_2O_5+Nb_2O_5$)/($P_2O_5+SiO_2+B_2O_3+Al_2O_3$)) is preferably 0.1 to 8, more preferably 0.2 to 2, still more preferably 0.2 to 1.5, yet still more preferably 0.3 to 1.3, yet still more preferably 0.4 to 1.2, and particularly preferably 0.5 to 1.1. If ($TiO_2+V_2O_5+Nb_2O_5$)/($P_2O_5+SiO_2+B_2O_3+Al_2O_3$) is too small, the amount of active material components becomes small, so that the discharge capacity tends to decrease. Furthermore, alkali ions inserted during the first discharge are likely to be absorbed in the negative-electrode active material, so that the first charge/discharge efficiency tends to decrease. On the other hand, if ($TiO_2+V_2O_5+Nb_2O_5$)/($P_2O_5+SiO_2+B_2O_3+Al_2O_3$) is too large, this results in an inability to reduce the volume change of Ti ions due to charge and discharge, so that the cycle characteristics tend to decrease.

The molar ratio between the contents of $R_2O+R'O$ and $P_2O_5+SiO_2+B_2O_3+Al_2O_3$ (($R_2O+R'O$)/($P_2O_5+SiO_2+B_2O_3+Al_2O_3$)) is preferably 0.4 to 2.5, more preferably 0.5 to 2.3, still more preferably 1.0 to 2.2, and particularly preferably 1.5 to 2.1. If ($R_2O+R'O$)/($P_2O_5+SiO_2+B_2O_3+Al_2O_3$) is too small, the ion conductivity decreases, so that the redox potential due to charge and discharge tends to increase. On the other hand, if ($R_2O+R'O$)/($P_2O_5+SiO_2+B_2O_3+Al_2O_3$) is too large, this results in an inability to reduce the volume change of Ti ions due to charge and discharge, so that the cycle characteristics tend to decrease.

In addition to the above components, various components can be contained in the negative-electrode active material without impairing the effects of the present invention. Specifically, in terms of oxides, CuO, SnO, $Bi_2O_3$, $GeO_2$, $ZrO_2$ or $Sb_2O_5$ can be contained in the negative-electrode active material. The content of the above components is, in total, preferably 0 to 40%, more preferably 0.1 to 30%, and particularly preferably 0.5 to 20%.

The negative-electrode active material for electricity storage devices according to the present invention can be manufactured, for example, by the crystallized glass method. A specific manufacturing method will be described below.

First, powders of raw materials are formulated to give the above-described composition, thus obtaining a raw material batch. Next, the obtained raw material batch is melted. The melting temperature may be appropriately adjusted so that the raw material batch is homogeneously melted. Specifically, the melting temperature is preferably 800° C. or more and particularly preferably 900° C. or more. No particular limitation is placed on the upper limit of the melting temperature, but excessively high melting temperatures lead to energy loss or evaporation of the sodium component. Therefore, the melting temperature is preferably not more than 1600° C. and particularly preferably not more than 1500° C.

The obtained melt is formed into a shape to obtain a melt-solidified body. No particular limitation is placed on the method of forming the melt into a shape. For example, the melt may be poured between a pair of cooling rolls and thus formed into a film shape while being rapidly cooled or the melt may be cast into a mold and thus formed in an ingot shape. The melt-solidified body is normally formed of an amorphous body, but may contain crystalline phases.

Next, the melt-solidified body is heat-treated at a predetermined temperature for a predetermined time to be crystallized, thus obtaining a negative-electrode active material made of crystallized glass. The heat treatment is done, for example, in an electric furnace where the temperature is controllable. The heat treatment temperature is preferably equal to or above the glass transition temperature of the amorphous body and more preferably equal to or above the crystallization temperature thereof. Specifically, the heat treatment temperature is preferably 350° C. or more and particularly preferably 400° C. or more. The heat treatment time is appropriately adjusted so that the crystallization fully progresses. Specifically, the heat treatment time is preferably 0.3 to 6 hours and particularly preferably 0.5 to 4 hours.

The heat treatment of the melt-solidified body may be done in any of an air atmosphere, an inert atmosphere, and a reductive atmosphere.

When the negative-electrode active material according to the present invention is manufactured by the crystallized glass method, an amorphous phase can be easily formed inside of the negative-electrode active material. As a result, the negative-electrode active material is likely to be given the previously-described effects due to the amorphous phase.

Besides the crystallized glass method, the negative-electrode active material may be manufactured by the solid reaction method in which powders of raw materials are mixed and the mixture is fired in a firing furnace. Note that when the negative-electrode active material according to the present invention is manufactured by the crystallized glass method, the content of crystalline phases is likely to be high. As a result, the discharge capacity is likely to increase and the operating voltage is likely to decrease.

The negative-electrode active material obtained by the above methods is, as necessary, ground or classified in order to obtain powder having a desired size. For grinding, a mortar, a ball mill, a vibrating ball mill, a satellite ball mill, a planetary ball mill, a jet mill or other means can be used. For classification, sieving, centrifugation, air classification or other methods can be used.

When the negative-electrode active material is in powder form, its average particle size is preferably 0.1 to 20 m, more preferably 0.2 to 15 m, still more preferably 0.3 to 10 μm, and particularly preferably 0.5 to 5 μm. Furthermore, its maximum particle size is preferably 150 μm or less, more preferably 100 m or less, still more preferably 75 μm or less, and particularly preferably 55 μm or less. If the average particle size or maximum particle size of the negative-electrode active material is too large, this results in an inability to reduce the volume change of the negative-electrode active material due to insertion and extraction of alkali ions during charge and discharge, so that the negative-electrode active material is likely to peel off from the current collector and the cycle characteristics tend to significantly decrease. On the other hand, if the average particle size is too small, the dispersed state of powder when the negative-electrode active material is pasted is likely to be poor. As a result, it becomes necessary to increase the amounts of binder and solvent added or the applicability becomes poor, so that a uniform electrode formation tends to become difficult.

Herein, the average particle size and the maximum particle size refer to a median primary particle diameter D50 (diameter at 50% cumulative volume) and a median primary particle diameter D90 (diameter at 90% cumulative volume), respectively, and are values measured by a laser diffraction particle size distribution measurement device.

Furthermore, the specific surface area of the negative-electrode active material in powder state measured by the BET method is preferably 0.1 to 20 $m^2/g$, more preferably 0.15 to 15 $m^2/g$, and particularly preferably 0.2 to 10 $m^2/g$. If the specific surface area of the negative-electrode active material is too small, alkali ions cannot be rapidly inserted and extracted, so that the charge/discharge time tends to be long. On the other hand, if the specific surface area of the negative-electrode active material is too large, the dispersed state of powder when the negative-electrode active material is pasted is likely to be poor. As a result, it becomes necessary to increase the amounts of binder and solvent added or the applicability becomes poor, so that a uniform electrode formation tends to become difficult.

The negative-electrode active material for electricity storage devices according to the present invention is preferably coated or mixed with electrically conductive carbon to be given electrical conductivity. By coating the surface of the negative-electrode active material with electrically conductive carbon, the electronic conductivity becomes high, so that the rapid charge/discharge characteristics are likely to increase. Examples of the electrically conductive carbon that can be used include highly electrically conductive carbon blacks, such as acetylene black and Ketjenblack, carbon powders, such as graphite, and carbon fibers. Preferred among them is acetylene black because of its high electronic conductivity.

An example of a method for mixing the negative-electrode active material and the electrically conductive carbon while grinding them is a method in which a general grinder is used, such as a mortar, a mortar mixer, a ball mill, an attritor, a vibrating ball mill, a satellite ball mill, a planetary ball mill, a jet mill or a bead mill. Preferred among them is the use of a planetary ball mill. The planetary ball mill has a structure in which a disk rotates on its axis while pots thereon rotate on their own axises, so that very high impact energy can be efficiently produced to enable homogeneous dispersion of the electrically conductive carbon into the negative-electrode active material.

Furthermore, another example of the method for giving the negative-electrode active material electrical conductivity is a method of mixing a negative-electrode active material in powder state and an organic compound and then firing the mixture in an inert atmosphere or a reductive atmosphere to carbonize the organic compound, thus coating the surface of the negative-electrode active material with the electrically conductive carbon. In manufacturing the negative-electrode active material by the crystallized glass method, it is also possible to mix glass powder which is a precursor of the negative-electrode active material with an organic compound and then fire the mixture, thus achieving the crystallization of the glass powder simultaneously with the coating thereof with the electrically conductive carbon. Any organic compound may be used as far as it can stay as carbon after being subjected to heat treatment and examples include glucose, citric acid, ascorbic acid, phenolic resin, and a surfactant. Particularly preferred is a surfactant because of its ease of adsorption on the surface of the negative-electrode active material. The surfactant may be any of a cationic surfactant, an anionic surfactant, an amphoteric surfactant, and a non-ionic surfactant, but particularly preferred is a non-ionic surfactant because of its excellent adsorbability on the surface of the negative-electrode active material.

The content of the electrically conductive carbon is, per 100 parts by mass of negative-electrode active material, preferably 0.01 to 20 parts by mass, more preferably 0.03 to 15 parts by mass, still more preferably 0.05 to 12 parts by mass, and particularly preferably 0.07 to 10 parts by mass. If the content of electrically conductive carbon is too small, the negative-electrode active material is insufficiently coated and tends to be less electronically conductive. On the other hand, if the carbon content is too large, the proportion of negative-electrode active material in the negative electrode material becomes small, so that the discharge capacity is likely to decrease.

The thickness of the electrically conductive carbon coating formed on the surface of the negative-electrode active material is preferably 1 to 100 nm and particularly preferably 5 to 80 nm. If the thickness of the electrically conductive carbon coating is too small, the coating may be lost in the charging/discharging process to deteriorate the battery characteristics. On the other hand, if the thickness of the electrically conductive carbon coating is too large, the discharge capacity and operating voltage of the electricity storage device are likely to decrease.

In the negative-electrode active material on the surface of which an electrically conductive carbon coating is formed, the ratio (D/G) of a peak intensity D between 1300 and 1400 $cm^{-1}$ to a peak intensity G between 1550 and 1650 $cm^{-1}$, both measured by Raman spectroscopy, is preferably 1 or less and particularly preferably 0.8 or less, and the ratio (F/G) of a peak intensity F between 800 to 1100 $cm^{-1}$ to the peak intensity G is preferably 0.5 or less and particularly preferably 0.1 or less. Here, the peak intensity G originates from crystalline carbon and the peak intensity D originates from amorphous carbon. Therefore, as the peak intensity ratio D/G is smaller, this means that the electrically conductive carbon coating is more crystalline, and the electronic conductivity tends to be higher. Furthermore, the peak intensity F originates from the components of the negative-electrode active material. Therefore, as the peak intensity ratio F/G is smaller, this means that a higher proportion of the surface of the negative-electrode active material is covered with crystalline, electrically conductive carbon coating, and the electronic conductivity tends to be higher.

The negative-electrode active material for electricity storage devices according to the present invention has a tapped density of preferably 0.3 g/ml or more and particularly preferably 0.5 g/ml or more. If the tapped density of the negative-electrode active material is too small, the electrode density becomes small, so that the discharge capacity per unit volume of the electrode tends to decrease. The upper limit of the tapped density is a value approximately corresponding to the true specific gravity of the negative-electrode active material, but is, in consideration of powder aggregation, actually 5 g/ml or less and particularly ≤4 g/ml or less. Note that in the present invention the tapped density refers to a value measured under conditions of a tapping stroke of 10 mm, a number of taps of 250, and a tapping rate of two taps per second.

The negative-electrode active material for electricity storage devices according to the present invention can be used as a negative electrode material for electricity storage devices by adding a binder and a conductive aid to make the negative-electrode active material into paste form.

The binder is a component to be added to the negative-electrode active material in order to bind the negative-electrode active material particles together or bind the negative-electrode active material and the solid electrolyte to prevent the negative-electrode active material from peeling off the negative electrode due to a volume change during charge and discharge. Examples of the binder include thermoplastic straight-chain polymers, such as polytetrafluoroethylene (PTFE), poly(vinylidene fluoride) (PVDF), fluorine-containing rubbers, and styrene-butadiene rubber (SBR); thermosetting resins, such as thermosetting polyimide, polyamide-imide, polyamide, phenolic resin, epoxy resin, urea resin, melamine resin, unsaturated polyester resin, and polyurethane; cellulose derivatives, such as carboxymethyl cellulose (including salts of carboxymethyl cellulose, such as sodium carboxymethyl cellulose, the same applies hereafter), hydroxypropylmethyl cellulose, hydroxypropyl cellulose, hydroxyethyl cellulose, ethyl cellulose, and hydroxymethyl cellulose; and water-soluble polymers, such as polyvinyl alcohol, polyacrylamide, polyvinyl pyrrolidone, and their copolymers. Among them, thermosetting resins, cellulose derivatives, and water-soluble polymers are preferred because of their excellent binding properties and thermosetting polyimide or carboxymethyl cellulose is more preferred because of their industrially widespread use. Particularly, carboxymethyl cellulose is most preferred because it is inexpensive and does not need any organic solvent for preparation of a paste, thus having a low environmental burden. These binders may be used singly or in a mixture of two or more of them.

Examples of the conductive aid include highly electrically conductive carbon blacks, such as acetylene black and Ketjenblack, carbon powders, such as graphite, and carbon fibers.

Furthermore, the negative-electrode active material for electricity storage devices according to the present invention can also be used as a composite material as an electrode by mixing with a below-described alkali-ion conductive solid electrolyte.

The above negative electrode material for electricity storage devices can be used as a negative electrode for electricity storage devices by applying the negative electrode material for electricity storage devices to the surface of a metal foil or the like serving as a current collector or by using the negative electrode material for electricity storage devices to form a negative electrode layer and then forming a metal thin film or the like on the surface of the negative electrode layer.

The negative electrode for electricity storage devices can be used as an electricity storage device by combining with a separately prepared positive electrode for electricity storage devices and an electrolyte. An aqueous electrolyte, a nonaqueous electrolyte or a solid electrolyte can be used as the electrolyte.

The aqueous electrolyte is made by dissolving an electrolyte salt in water. When alkali ions to be supplied from the positive electrode are lithium ions, examples of the electrolyte salt include $LiNO_3$, $LiOH$, $LiF$, $LiCl$, $LiBr$, $LiI$, $LiClO_4$, $Li_2SO_4$, $CH_3COOLi$, $LiBF_4$, and $LiPF_6$. When the alkali ions are sodium ions, examples of the electrolyte salt include $NaNO_3$, $Na_2SO_4$, $NaOH$, $NaCl$, and $CH_3COONa$. When the alkali ions are potassium ions, examples of the electrolyte salt include $KNO_3$, $KOH$, $KF$, $KCl$, $KBr$, $KI$, $KClO_4$, $K_2SO_4$, $CH_3COOK$, $KBF_4$, and $KPF_6$. These electrolyte salts may be used singly or in a mixture of two or more of them. The electrolyte salt concentration is appropriately adjusted, generally, within a range of not less than 0.1 M and not more than the saturation concentration.

The nonaqueous electrolyte contains: an organic solvent and/or an ionic liquid each of which is a nonaqueous solvent; and an electrolyte salt dissolved in the nonaqueous solvent. Specific examples of the organic solvent, the ionic liquid, and the electrolyte salt are as follows. Note that the characters in [ ] after the below-mentioned compound names indicate abbreviations.

Examples of the organic solvent include propylene carbonate [PC], ethylene carbonate [EC], 1,2-dimethoxyethane [DME], γ-butyrolactone [GBL], tetrahydrofuran [THF], 2-methyltetrahydrofuran [2-MeHF], 1,3-dioxolan, sulfolane, acetonitrile [AN], diethyl carbonate [DEC], dimethyl carbonate [DMC], methylethyl carbonate [MEC], and dipropyl carbonate [DPC]. These organic solvents may be used singly or in a mixture of two or more of them. Preferred among them is propylene carbonate because of its excellent low-temperature characteristics.

Examples of the ionic liquid include: aliphatic quaternary ammonium salts, such as N,N,N-trimethyl-N-propyl ammonium bis(trifluoromethanesulfonyl)imide [TMPA-TFSI], N-methyl-N-propylpiperidinium bis(trifluoromethanesulfonyl)imide [PP13-TFSI], N-methyl-N-propylpyrrolidinium bis(trifluoromethanesulfonyl)imide [P13-TFSI], and N-methyl-N-butylpyrrolidinium bis(trifluoromethanesulfonyl)imide [P14-TFSI]; and quaternary alkylimidazolium salts, such as 1-methyl-3-ethylimidazolium tetrafluoroborate [EMIBF4], 1-methyl-3-ethylimidazolium bis(trifluoromethanesulfonyl)imide [EMITFSI], 1-allyl-3-ethylimidazolium bromide [AEImBr], 1-allyl-3-ethylimidazolium tetrafluoroborate [AEImBF4], 1-allyl-3-ethylimidazolium bis(trifluoromethanesulfonyl)imide [AEImTFSI], 1,3-diallylimidazolium bromide [AAImBr], 1,3-diallylimidazolium tetrafluoroborate [AAImBF4], and 1,3-diallylimidazolium bis(trifluoromethanesulfonyl)imide [AAImTFSI].

Examples of the electrolyte salt include lithium salts, sodium salts, and potassium salts of $PF_6^-$, $BF_4^-$, $(CF_3SO_2)_2N^-$ [TFSI], $CF_3SO_3^-$ [TFS], $(C_2F_5SO_2)_2N^-$ [BETI], $ClO_4^-$, $AsF_6^-$, $SbF_6^-$, $B(C_2O_4)_2^-$ [BOB], $BF_2OCOOC(CF_3)_3^-$ [B(HHIB)], and so on. These electrolyte salts may be used singly or in a mixture of two or more of them. Particularly preferred are lithium salts, sodium salts, and potassium salts of $PF_6^-$ and $BF_4^-$, which are inexpensive. The electrolyte salt concentration is appropriately adjusted, generally, within a range of not less than 0.5 M and not more than 3 M.

The nonaqueous electrolyte may contain an additive, such as vinylene carbonate [VC], vinylene acetate [VA], vinylene butyrate, vinylene hexanoate, vinylene crotonate or catechol carbonate. These additives serve to form a protective film ($LiCO_x$ or the like) on the surface of the negative-electrode active material. The amount of additive is, per 100 parts by mass of nonaqueous electrolyte, preferably 0.1 to 3 parts by mass and particularly preferably 0.5 to 1 parts by mass. If the amount of additive is too small, the above effect is less likely to be achieved. On the other hand, even if the amount of additive is too large, improvement in the effect is less likely to be achieved.

When alkali ions supplied from the positive electrode to the negative electrode are lithium ions, examples of the solid electrolyte include lithium β-alumina, lithium β"-alumina, $Li_2S$—$P_2S_5$ glass or crystallized glass, $Li_{1+x}Al_xGe_{2-x}(PO_4)_3$ crystal or crystallized glass, $Li_{14}Al_{0.4}(Ge_{2-x}Ti_x)_{1.6}(PO_4)_3$ crystal or crystallized glass, $Li_{3x}La_{2/3-x}TiO_3$ crystal or crystallized glass, $Li_{0.8}La_{0.6}Zr_2(PO_5)_3$ crystal or crystallized glass, $Li_{1+x}Ti_{2-x}Al_x(PO_4)_3$ crystal or crystallized glass, $Li_{1+x+y}Ti_{2-x}Al_xSi_y(PO_4)_{3-y}$ crystal or crystallized glass, and $LiTi_xZr_{2-x}(PO_4)_3$ crystal or crystallized glass. When the alkali ions are sodium ions, examples of the solid electrolyte include sodium β-alumina, sodium β"-alumina, $Na_{1+x}Zr_2Si_xP_{3-x}O_{12}$ crystal or crystallized glass, $Na_{3.12}Si_2Zr_{1.88}Y_{0.12}PO_{12}$ crystal or crystallized glass, and $Na_{5.9}Sm_{0.6}Al_{0.1}P_{0.3}Si_{3.6}O_9$ crystallized glass. When the alkali ions are potassium ions, examples of the electrolyte salt include potassium β-alumina and potassium β"-alumina.

Among the above electrolytes, nonaqueous electrolytes and solid electrolytes are preferred because of their wide potential windows. Particularly, solid electrolytes having alkali-ion conductivity have wide potential windows and, therefore, produce little gas due to electrolyte decomposition during charge and discharge, so that the safety of the electricity storage device can be increased.

In an electricity storage device based on an electrolytic solution in which an aqueous electrolyte or a nonaqueous electrolyte is used, a separator is preferably provided between the electrodes. The separator is made of a material having insulation properties and specific examples of the material that can be used include porous film or non-woven fabric obtained from a polymer, such as polyolefin, cellulose, polyethylene terephthalate or vinylon; non-woven glass fabric containing glass fibers; glass cloth in which glass fibers are woven, and film-like glass.

The type of positive-electrode active material for use in the positive electrode is not particularly limited and can be appropriately selected depending on the type or so on of the desired electricity storage device. For example, in a sodium-ion secondary battery, examples of the positive-electrode active material include $NaFeO_2$, $NaNiO_2$, $NaCoO_2$, $NaMnO_2$, $NaVO_2$, $Na(Ni_xMn_{1-x})O_2$, $Na(Fe_xMn_{1-x})O_2$ (where 0<x<1), $NaVPO_4$, $Na_2FeP_2O_7$, and $Na_3V_2(PO_4)_3$. In a lithium-ion secondary battery, examples of the positive-electrode active material include $LiCoO_2$, $LiNiO_2$, $LiCo_{1/3}Ni_{1/3}Mn_{1/3}O_2$, $LiVO_2$, $LiCrO_2$, $LiMn_2O_4$, $LiFePO_4$, and $LiMnPO_4$.

After an electricity storage device in which the negative-electrode active material for electricity storage devices according to the present invention is used is charged and discharged, the negative-electrode active material may contain an oxide of lithium, sodium or potassium, an oxide containing $Ti^{4+}$, $Ti^{3+}$ or $Ti^{2+}$, or like substances. For example, the negative-electrode active material for electricity storage devices according to the present invention contains, at the completion of discharge, in terms of % by mole of oxide, 1 to 75% $R_2O$ (where R represents at least one selected from Li, Na, and K), 0.5 to 59% $TiO_2$, and 10 to 65% $P_2O_5+SiO_2+B_2O_3$. Here, in the sodium-ion secondary battery, the term "at the completion of discharge" refers to a state where, in a test cell in which the negative-electrode active material for electricity storage devices according to the present invention is used as a negative electrode, metallic sodium is used as a positive electrode, and a 1M $NaPF_6$ solution/EC:DEC=1:1 is used as an electrolytic solution, the cell has been charged at a constant current of 0.1 C rate to 0.5 V (vs. $Na^+/Na$) and then discharged at a constant current of 0.1 C rate to 2.5V. Furthermore, in the lithium-ion secondary battery, the term "at the completion of discharge" refers to a state where, in a test cell in which the negative-electrode active material for electricity storage devices according to the present invention is used as a negative electrode, metallic lithium is used as a positive electrode, and a 1M $NaPF_6$ solution/EC:DEC=1:1 is used as an electrolytic solution, the cell has been charged at a constant current of 0.1 C rate to 1.5 V (vs. $Li^+/Li$) and then discharged at a constant current of 0.1 C rate to 3.2 V.

Although the description has heretofore been given mainly of the case where the electricity storage device is an alkali-ion secondary battery, such as a lithium-ion secondary battery or a sodium-ion secondary battery, the present invention is not limited to them and is also applicable to, for example, a hybrid capacitor in which a negative-electrode active material for use in a lithium-ion secondary battery, a sodium-ion secondary battery or like battery is combined with a positive electrode material for a nonaqueous electric double layer capacitor.

Each of a lithium-ion capacitor and a sodium-ion capacitor which are hybrid capacitors is a type of asymmetric capacitor having different charge/discharge principles between the positive and negative electrodes. The lithium-ion capacitor has a structure in which a negative electrode for a lithium-ion secondary battery is combined with a positive electrode for an electric double layer capacitor. The sodium-ion capacitor has a structure in which a negative electrode for a sodium-ion secondary battery is combined with a positive electrode for an electric double layer capacitor. In these cases, the positive electrode has an electric double layer formed on the surface thereof and is charged and discharged using a physical action (electrostatic action), while the negative electrode is charged and discharged, like the previously described lithium-ion secondary battery or sodium-ion secondary battery, by a chemical reaction (insertion and extraction) of lithium ions or sodium ions.

For the positive electrodes of the lithium-ion capacitor and the sodium-ion capacitor, a positive-electrode active material is used which is made of carbonaceous powder having a high specific surface area, such as activated charcoal, polyacene or mesophase carbon. On the other hand, for the negative electrodes thereof, the negative-electrode active material according to the present invention can be used.

When the negative-electrode active material according to the present invention is used in the lithium-ion capacitor or the sodium-ion capacitor, it is necessary to previously insert lithium ions or sodium ions and electrons in the negative-electrode active material. The means for implementing this is not particularly limited. For example, a metallic lithium electrode or a metallic sodium electrode, which serves as a supply source of lithium ions or sodium ions and electrons, may be placed in a capacitor cell and brought into contact directly or through a conductor with a negative electrode containing the negative-electrode active material according to the present invention. Alternatively, after previously inserting lithium ions or sodium ions and electrons in the negative-electrode active material according to the present invention in a separate cell, the negative-electrode active material may be incorporated into a capacitor cell.

EXAMPLES

Hereinafter, a description will be given, as an example of the negative-electrode active material for electricity storage devices according to the present invention, of working examples applied to secondary batteries in which a non-aqueous electrolyte or a solid electrolyte is used, but the present invention is not limited to these working examples.

Secondary Battery Using Nonaqueous Electrolyte

Tables 1 to 8 show working examples (Nos. 1 to 36) of the present invention and comparative examples (Nos. 37 and 38).

TABLE 1

| | | 1 | 2 | 3 | 4 |
|---|---|---|---|---|---|
| composition (% by mole) | $Li_2O$ | | | | |
| | $Na_2O$ | 50 | 49.3 | 48.9 | 48.5 |
| | $K_2O$ | | | | |
| | $TiO_2$ | 20 | 19.7 | 19.6 | 19.5 |
| | $P_2O_5$ | 30 | 31 | 31.5 | 32 |
| | $TiO_2/P_2O_5$ | 0.67 | 0.64 | 0.62 | 0.61 |
| | $R_2O/P_2O_5$ | 1.67 | 1.59 | 1.55 | 1.52 |
| | Crystallinity (% by mass) | 78 | 63 | 68 | 90 |
| | Type of Precipitated Crystal | $Na_5TiP_3O_{12}$ | $Na_5TiP_3O_{12}$ | $Na_5TiP_3O_{12}$ | $Na_5TiP_3O_{12}$ |
| NIB Battery Characterstics | Discharge Capacity (mAh/g) | 62 | 57 | 57 | 57 |
| | Discharge Voltage (V) | 1.19 | 1.22 | 1.21 | 1.27 |
| | First Charge/Discharge Efficiency (%) | 97 | 91 | 91 | 90 |
| | Discharge Capacity Retention (%) | 88 | 89 | 89 | 90 |
| LIB Battery Characterstics | Discharge Capacity (mAh/g) | 59 | 58 | 57 | 56 |
| | Discharge Voltage (V) | 1.49 | 1.5 | 1.52 | 1.62 |
| | First Charge/Discharge Efficiency (%) | 93 | 92 | 92 | 91 |
| | Discharge Capacity Retention (%) | 95 | 96 | 96 | 96 |

TABLE 2

| | | 5 | 6 | 7 | 8 |
|---|---|---|---|---|---|
| composition (% by mole) | $Li_2O$ | | | | |
| | $Na_2O$ | 47.2 | 45.5 | 50 | 49.4 |
| | $K_2O$ | | | | |
| | $TiO_2$ | 18.8 | 18.1 | 25 | 25.3 |
| | $P_2O_5$ | 34 | 36.4 | 25 | 25.3 |
| | $TiO_2/P_2O_5$ | 0.55 | 0.50 | 1.00 | 1.00 |
| | $R_2O/P_2O_5$ | 1.39 | 1.25 | 2.00 | 1.95 |
| | Crystallinity (% by mass) | 91 | 85 | 81 | 73 |
| | Type of Precipitated Crystal | $Na_5TiP_3O_{12}$ $Na_{0.29}TiO_{2.14}$ | $Na_5TiP_3O_{12}$ $Na_{0.22}TiO_{2.11}$ $Na_{0.29}TiO_2$ | $Na_4TiP_2O_9$ $Na_{3.91}TiP_2O_9$ | $Na_{3.91}TiP_2O_9$ $Na_4TiP_2O_9$ $Na_5TiP_3O_{12}$ |
| NIB Battery Characteristics | Discharge Capacity (mAh/g) | 55 | 52 | 77 | 76.5 |
| | Discharge Voltage (V) | 1.4 | 1.6 | 1.2 | 1.2 |
| | First Charge/Discharge Efficiency (%) | 90 | 91 | 97 | 97 |
| | Discharge Capacity Retention (%) | 91 | 94 | 86 | 87 |
| LIB Battery Characterstics | Discharge Capacity (mAh/g) | 53 | 52 | 78 | 74 |
| | Discharge Voltage (V) | 1.7 | 1.92 | 1.53 | 1.57 |
| | First Charge/Discharge Efficiency (%) | 91 | 92 | 98 | 98 |
| | Discharge Capacity Retention (%) | 98 | 98 | 94 | 95 |

TABLE 3

| | | 9 | 10 |
|---|---|---|---|
| composition (% by mole) | $Li_2O$ | | |
| | $Na_2O$ | 50 | 50 |
| | $K_2O$ | | |
| | $TiO_2$ | 20 | 25 |
| | $P_2O_5$ | 30 | 25 |
| | $TiO_2/P_2O_5$ | 0.67 | 1.00 |
| | $R_2O/P_2O_5$ | 1.67 | 2.00 |
| | Crystallinity (% by mass) | 100 | 100 |
| | Type of Precipitated Crystal | $Na_5TiP_3O_{12}$ | $Na_4TiP_2O_9$ |
| NIB Battery Characteristics | Discharge Capacity (mAh/g) | 68 | 79 |
| | Discharge Voltage (V) | 1.15 | 1.15 |
| | First Charge/Discharge Efficiency (%) | 96 | 97 |
| | Discharge Capacity Retention (%) | 82 | 81 |
| LIB Battery Characteristics | Discharge Capacity (mAh/g) | — | — |
| | Discharge Voltage (V) | — | — |
| | First Charge/Discharge Efficiency (%) | — | — |
| | Discharge Capacity Retention (%) | — | — |

TABLE 4

| | | 11 | 12 | 13 | 14 |
|---|---|---|---|---|---|
| Composition (% by mole) | $Li_2O$ | | | | |
| | $Na_2O$ | 36 | 33.3 | 25 | 18 |
| | $K_2O$ | | | | |
| | $TiO_2$ | 28.5 | 33.3 | 25 | 47 |
| | $P_2O_5$ | 7 | | | |
| | $B_2O_3$ | | | | |
| | $SiO_2$ | 28.5 | 33.3 | 50 | 35 |
| | $TiO_2/(P_2O_5 + B_2O_3 + SiO_2)$ | 0.80 | 1.00 | 0.50 | 1.34 |
| | $R_2O/(P_2O_5 + B_2O_3 + SiO_2)$ | 1.01 | 1.00 | 0.50 | 0.51 |
| Firing Temperature | (° C.) | 700 | 700 | 900 | 920 |
| Firing Time | (hour) | 1 | 1 | 5 | 1 |
| | Crystallinity (% by mass) | 78 | 56 | 91 | 80 |
| | Type of Piecipitated Crystal | $Na_{2.5}TiSiP_{0.5}O_{6.5}$ ($Na_5Ti_2Si_2PO_{13}$) | $Na_2TiSiO_5$ | $Na_2TiSi_2O_7$ | $NaTiSiO_{4.5}$ ($Na_2Ti_2Si_2O_9$) |
| * Characters in ( ) indicate rational formula. | | | | | |
| Battery Characteristics | Discharge Capacity (mAh/g) | 81 | 92 | 75 | 112 |
| | Discharge Voltage (V) | 0.9 | 0.81 | 0.98 | 0.9 |
| | First Charge/Discharge Efficiency (%) | 76 | 74 | 70 | 69 |
| | Discharge Capacity Retention (%) | 92 | 94 | 84 | 83 |

TABLE 5

| | | 15 | 16 | 17 | 18 | 19 | 20 |
|---|---|---|---|---|---|---|---|
| Composition (% by mole) | $Li_2O$ | | | | | | |
| | $Na_2O$ | 49 | 47.6 | 46.5 | 45.5 | 50 | 50 |
| | $K_2O$ | | | | | | |
| | $TiO_2$ | 19.6 | 19 | 18.6 | 18.2 | 19.4 | 18.8 |
| | $P_2O_5$ | 29.4 | 28.6 | 27.9 | 27.3 | 30 | 30 |
| | $B_2O_3$ | | | | | | |
| | $SiO_2$ | | | 7 | 9 | | |
| | $Al_2O_3$ | 2 | 4.8 | | | | |
| | $Nb_2O_5$ | | | | | 0.6 | 1.2 |
| | $(TiO_2 + Nb_2O_5)/(P_2O_5 + B_2O_3 + SiO_2 + Al_2O_3)$ | 0.62 | 0.57 | 0.53 | 0.50 | 0.67 | 0.67 |
| | $(R_2O + R'O)/(P_2O_5 + B_2O_3 + SiO_2 + Al_2O_3)$ | 1.56 | 1.43 | 1.33 | 1.25 | 1.67 | 1.67 |
| | Firing Temperature (° C.) | 700 | 700 | 700 | 700 | 700 | 700 |
| | Firing Time (hour) | 1 | 1 | 1 | 1 | 1 | 1 |
| | Crystallinity (% by mass) | 96 | 92 | 97 | 95 | 97 | 97 |
| | Type of Precipitated Crystal | $Na_5TiP_3O_{12}$ $Na_4TiP_2O_9$ | $Na_4TiP_2O_9$ $Na_3Al_2(PO_4)_3$ | $Na_5TiP_3O_{12}$ | $Na_5TiP_3O_{12}$ | $Na_5(Ti_{0.97}Nb_{0.03})P_3O_{12}$ | $Na_5TiP_3O_{12}$ $Na_{0.5}Nb_2(PO_4)_3$ ($=Na_{0.25}NbP_{1.5}O_6$) |
| NIB Battery Characterstics | Discharge Capacity (mAh/g) | 64 | 59 | 64 | 62 | 70 | 73 |
| | Discharge Voltage (V) | 1.23 | 1.29 | 1.19 | 1.18 | 1.21 | 1.23 |
| | First Charge/Discharge Efficiency (%) | 70 | 69 | 70 | 71 | 75 | 78 |
| | Discharge Capacity Retention (%) | 90 | 91 | 87 | 87 | 89 | 91 |

TABLE 6

| | | 21 | 22 | 23 | 24 | 25 | 26 |
|---|---|---|---|---|---|---|---|
| Composition (% by mole) | $Li_2O$ | | | | | | |
| | $Na_2O$ | 18.2 | 30 | 12.3 | | 25 | |
| | $K_2O$ | | | | | | 25 |
| | $TiO_2$ | 36.4 | 52 | 76.4 | 74 | 50 | 50 |
| | $P_2O_5$ | 9 | | | 26 | 25 | 25 |
| | $B_2O_3$ | | | | | | |
| | $SiO_2$ | 36.4 | | | | | |
| | $Al_2O_3$ | | 18 | 11.3 | | | |
| | $Nb_2O_5$ | | | | | | |
| | $(TiO_2 + Nb_2O_5)/(P_2O_5 + B_2O_3 + SiO_2 + Al_2O_3)$ | 0.80 | 2.89 | 6.76 | 2.85 | 2.00 | 2.00 |
| | $(R_2O + R'O)/(P_2O_5 + B_2O_3 + SiO_2 + Al_2O_3)$ | 0.40 | 1.67 | 1.08 | 0.00 | 1.00 | 1 |
| | Firing Temperature (° C.) | 700 | 800 | 700 | 800 | 700 | 700 |
| | Firing Time (hour) | 1 | 1 | 1 | 1 | 1 | 1 |
| | Crystallinity (% by mass) | 98 | 98 | 99 | 90 | 87 | 84 |
| | Type of Precipitated Crystal | $Na_2Ti_2Si_2PO_{13}$ | $Na_{1.97}Al_{1.82}Ti_{6.15}O_{16}$ $Na_2Al_2O_4$ | $Na_{1.97}Al_{1.82}Ti_{6.15}O_{16}$ | $TiP_2O_7$ $TiO_2$ | $NaTiO(PO_4)$ ($=NaTiPO_5$) | $KTiO(PO_4)$ ($=KTiPO_5$) |

TABLE 6-continued

|  |  | 21 | 22 | 23 | 24 | 25 | 26 |
|---|---|---|---|---|---|---|---|
| NIB Battery Characterstics | Discharge Capacity (mAh/g) | 108 | 47 | 88 | 196 | 102 | 98 |
|  | Discharge Voltage (V) | 0.83 | 0.6 | 0.6 | 1.36 | 1.52 | 1.43 |
|  | First Charge/Discharge Efficiency (%) | 73 | 69 | 75 | 62 | 81 | 79 |
|  | Discharge Capacity Retention (%) | 92 | 95 | 76 | 72 | 81 | 83 |

TABLE 7

|  |  | 27 | 28 | 29 | 30 | 31 |
|---|---|---|---|---|---|---|
| Composition (% by mole) | $Li_2O$ |  |  |  |  |  |
|  | $Na_2O$ |  |  |  |  |  |
|  | $K_2O$ |  |  | 12.5 |  |  |
|  | MgO |  |  |  |  | 60 |
|  | CaO |  | 33.3 |  |  |  |
|  | SrO |  |  |  |  |  |
|  | BaO | 33.3 |  | 12.5 | 40 |  |
|  | $TiO_2$ | 33.4 | 33.4 | 25 | 40 | 20 |
|  | $P_2O_5$ |  |  |  |  |  |
|  | $B_2O_3$ |  |  |  | 20 | 20 |
|  | $SiO_2$ | 33.3 | 33.3 | 50 |  |  |
|  | $Al_2O_3$ |  |  |  |  |  |
| $(TiO_2 + Nb_2O_5)/(P_2O_5 + B_2O_3 + SiO_2 + Al_2O_3)$ |  | 1.00 | 1.00 | 0.50 | 2.00 | 1.00 |
| $(R_2O + R'O)/(P_2O_5 + B_2O_3 + SiO_2 + Al_2O_3)$ |  | 1.00 | 1.00 | 0.5 | 2 | 3 |
| Firing Temperature (° C.) |  | 800 | 800 | 700 | 800 | 800 |
| Firing Time (hour) |  | 1 | 1 | 1 | 1 | 1 |
| Crystallinity (% by mass) |  | 98 | 99 | 98 | 97 | 96 |
| Type of Precipitated Crystal |  | $BaTiSiO_5$ | $CaTiSiO_5$ | $K_2BaTi_2(Si_2O_7)_2$ $(=KBa_{0.5}TiSi_2O_7)$ | $Ba_2Ti_2B_2O_9$ $(=BaTiBO_{4.5})$ | $Mg_3TiB_2O_8$ |
| NIB Battery Characterstics | Discharge Capacity (mAh/g) | 73 | 99 | 66 | 80 | 66 |
|  | Discharge Voltage (V) | 0.85 | 0.86 | 0.9 | 0.72 | 0.65 |
|  | First Charge/Discharge Efficiency (%) | 73 | 75 | 73 | 79 | 81 |
|  | Discharge Capacity Retention (%) | 88 | 78 | 87 | 86 | 88 |

|  |  | 32 | 33 | 34 | 35 | 36 |
|---|---|---|---|---|---|---|
| Composition (% by mole) | $Li_2O$ |  |  |  |  |  |
|  | $Na_2O$ |  |  |  |  |  |
|  | $K_2O$ |  |  |  |  |  |
|  | MgO |  | 12.5 | 30 | 12.5 |  |
|  | CaO |  |  |  |  |  |
|  | SrO |  |  |  |  | 12.5 |
|  | BaO | 12.5 |  |  |  |  |
|  | $TiO_2$ | 50 | 50 | 40 | 50 | 50 |
|  | $P_2O_5$ | 37.5 | 37.5 | 30 | 37.5 | 37.5 |
|  | $B_2O_3$ |  |  |  |  |  |
|  | $SiO_2$ |  |  |  |  |  |
|  | $Al_2O_3$ |  |  |  |  |  |
| $(TiO_2 + Nb_2O_5)/(P_2O_5 + B_2O_3 + SiO_2 + Al_2O_3)$ |  | 1.33 | 1.33 | 1.33 | 1.33 | 1.33 |
| $(R_2O + R'O)/(P_2O_5 + B_2O_3 + SiO_2 + Al_2O_3)$ |  | 0.33 | 0.33 | 1.00 | 0.33 | 0.33 |
| Firing Temperature (° C.) |  | 800 | 800 | 800 | 800 | 800 |
| Firing Time (hour) |  | 1 | 1 | 1 | 1 | 1 |
| Crystallinity (% by mass) |  | 98 | 98 | 98 | 96 | 96 |
| Type of Precipitated Crystal |  | $BaTi_4(PO_4)_6$ $(=Ba_{0.25}TiP_{1.5}O_6)$ | $MgTi_4(PO_4)_6$ $(=Mg_{0.25}TiP_{1.5}O_6)$ | $Mg_3Ti_4(PO_4)_6$ $(=Mg_{0.75}TiP_{1.5}O_6)$ | $CaTi_4(PO_4)_6$ $(=Ca_{0.25}TiP_{1.5}O_6)$ | $SrTi_4(PO_4)_6$ $(=Sr_{0.25}TiP_{1.5}O_6)$ |
| NIB Battery Characterstics | Discharge Capacity (mAh/g) | 84 | 109 | 81 | 97 | 83 |
|  | Discharge Voltage (V) | 0.78 | 0.77 | 0.81 | 0.8 | 0.75 |
|  | First Charge/Discharge Efficiency (%) | 69.0 | 70 | 74.0 | 71.7 | 71.3 |
|  | Discharge Capacity Retention (%) | 79 | 73 | 79 | 73 | 76 |

TABLE 8

|  |  | 37 | 38 |
|---|---|---|---|
| Composition (% by mole) | $Li_2O$ |  | 12.5 |
|  | $Na_2O$ | 12.5 |  |
|  | $K_2O$ |  |  |
|  | $TiO_2$ | 50 | 50 |
|  | $P_2O_5$ | 37.5 | 37.5 |
|  | $TiO_2/P_2O_5$ | 1.33 | 1.33 |
|  | $R_2O/P_2O_5$ | 0.33 | 0.33 |
| Crystallinity (% by mass) |  | 99 | 92 |
| Type of Precipitated Crystal |  | $Na_{0.5}TiP_{1.5}O_6$ | $Li_{0.5}TiP_{1.5}O_6$ |
| NIB Battery Characteristics | Discharge Capacity (mAh/g) | 130 | 130 |
|  | Discharge Voltage (V) | 2.16 | 2.15 |
|  | First Charge/Discharge Efficiency (%) | 96 | 94 |
|  | Discharge Capacity Retention (%) | 67 | 69 |
| LIB Battery Characteristics | Discharge Capacity (mAh/g) | 127 | 129 |
|  | Discharge Voltage (V) | 2.59 | 2.67 |
|  | First Charge/Discharge Efficiency (%) | 91 | 93 |
|  | Discharge Capacity Retention (%) | 69 | 68 |

(1) Preparation of Negative-Electrode Active Material (a) Preparation by Crystallized Glass Method Using various oxides, carbonates, and so on as raw materials, powders of the raw materials were formulated to give each composition shown in Tables 1, 2, 4 to 8. The powders of raw materials were loaded into a platinum crucible and melted at 1200 to 1500° C. for 60 minutes in an air atmosphere using an electric furnace. Next, resultant molten glass was poured between a pair of rotating rollers and formed into a shape with rapid cooling, thus obtaining a film-like melt-solidified body having a thickness of 0.1 to 2 mm. The film-like melt-solidified body was ground with a ball mill and then air-classified to obtain negative-electrode active material precursor powder having an average particle size of 2 μm.

An amount of 100 parts by mass of negative-electrode active material precursor powder obtained in the above manner was fully mixed with 21.4 parts by mass (corresponding to 12 parts by mass in carbon terms) of polyethylene oxide nonylphenyl ether (having an HLB value of 13.3 and a weight average molecular weight of 660), which is a non-ionic surfactant, as a carbon source and 10 parts by mass of ethanol, followed by drying at 100° C. for about an hour. Thereafter, the mixture was fired in an nitrogen atmosphere at 600° C. for an hour (as for NOs. 11 to 36, at temperatures for hours described in Tables 4 to 7) to simultaneously achieve carbonization of the non-ionic surfactant and crystallization of the powder, thus obtaining negative-electrode active material powder the surface of which was coated with carbon.

(b) Preparation by Solid Reaction Method

Sodium carbonate, sodium metaphosphate, and titanium oxide were weighed to give each composition described in Table 3, thus preparing a raw material batch. The raw material batch was mixed in ethanol using a planetary ball mill and then dried at 100° C. The dried raw material batch was calcined in an electric furnace at 900° C. for six hours and thus degassed. The calcined raw material batch was pressed into a shape at 500 kgf/cm² and then fired in an air atmosphere at 800° C. for five hours. The obtained sintered body was ground for five hours with a ball mill using a 20-mm diameter $ZrO_2$ ball and the ground product was air-classified to obtain negative-electrode active material powder having an average particle size D50 of 2 μm.

An amount of 100 parts by mass of negative-electrode active material powder obtained in the above manner was mixed well with 21.4 parts by mass (corresponding to 12 parts by mass in carbon terms) of polyethylene oxide nonylphenyl ether (having an HLB value of 13.3 and a weight average molecular weight of 660), which is a non-ionic surfactant, as a carbon source and 10 parts by mass of ethanol, followed by drying at 100° C. for about an hour. Thereafter, the mixture was fired in a nitrogen atmosphere at 600° C. for an hour to carbonize the non-ionic surfactant, thus obtaining negative-electrode active material powder the surface of which was coated with carbon.

(c) Identification of Crystal Structure

The obtained negative-electrode active material powder was subjected to powder X-ray diffraction measurement to identify its crystal structure. The results of crystal structure identification of the samples are shown in Tables 1 to 8. Furthermore, the XRD pattern of sample No. 1 is shown in FIG. 1. The XRD pattern of $Na_5Ti(PO_4)_3$ crystal (PDF card #39-0178) is also shown at the bottom of FIG. 1.

(2) Production of Negative Electrode

Electrically conductive carbon black (Super C65 manufactured by Timcal) as a conductive aid and poly(vinylidene fluoride) as a binder were weighed and mixed with the negative-electrode active material powder obtained in the above manner to reach a ratio of powder to conductive aid to binder of 85:5:10 (mass ratio) and the mixture was dispersed into N-methylpyrrolidinone (NMP), followed by well stirring with a planetary centrifugal mixer to form a slurry, thus obtaining a negative electrode material.

Next, the obtained negative electrode material was coated on a 20-μm thick copper foil serving as a negative electrode current collector using a doctor blade with a gap of 125 μm, and the negative electrode material coated on the copper foil was vacuum-dried by a dryer at 70° C. and then pressed by passing it between a pair of rotating rollers to obtain an electrode sheet. This electrode sheet was punched out into an 11-mm diameter disc by an electrode cutting machine and dried at a temperature of 150° C. for eight hours under reduced pressure, thereby obtaining a circular negative electrode.

(3) Production of Test Cell

A test cell for a sodium-ion secondary battery (NIB) was produced in the following manner. The negative electrode obtained in the above manner was placed, with its copper foil surface down, on a lower lid of a coin cell, and a separator formed of a 16-mm diameter polypropylene porous film dried at 70° C. for eight hours under reduced pressure and a metallic sodium layer as a counter electrode were laminated on the negative electrode, thus producing a test cell. A 1M $NaPF_6$ solution/EC:DEC=1:1 (where EC is ethylene carbonate and DEC is diethyl carbonate) was used as an electrolytic solution. The assembly of the test cell was conducted in an environment at a dew-point temperature minus 70° C. or below.

A test cell for a lithium-ion secondary battery (LIB) was produced in the following manner. The negative electrode obtained in the above manner was placed, with its copper foil surface down, on a lower lid of a coin cell, and a separator formed of a 16-mm diameter polypropylene porous film dried at 70° C. for eight hours under reduced pressure and a metallic lithium layer as a counter electrode were laminated on the negative electrode, thus producing a test cell. A 1M $LiPF_6$ solution/EC:DEC=1:1 (where EC is ethylene carbonate and DEC is diethyl carbonate) was used as an electrolytic solution. The assembly of the test cell was conducted in an environment at a temperature of the dew point minus 50° C. or below.

(4) Charge and Discharge Test

The test cell for a sodium-ion secondary battery was CC (constant-current) charged at 30° C. from an open circuit voltage to 0.5 V and its amount of electricity charged to the negative-electrode active material per unit mass (first charge capacity) was determined. Next, the test cell was CC discharged from 0.5 V to 2.5 V and its amount of electricity discharged from the negative-electrode active material per unit mass (first discharge capacity) was determined. However, as for the test cells Nos. 15 to 36, the first charge capacity was determined by charging them from the open circuit voltage to 0.01 V and, next, the first discharge capacity was determined by CC discharging them from 0.01 V to 2.5 V. The C rate was 0.1 C.

The test cell for a lithium-ion secondary battery was CC (constant-current) charged at 30° C. from an open circuit voltage to 1.5 V and its amount of electricity charged to the negative-electrode active material per unit mass (first charge capacity) was determined. Next, the test cell was CC discharged from 1.5 V to 3.2 V and its amount of electricity discharged from the negative-electrode active material per unit mass (first discharge capacity) was determined. The C rate was 0.1 C.

The results of the charge and discharge characteristics are shown in Tables 1 to 8. Furthermore, the first charge and discharge curves of the test cells for sodium-ion secondary batteries using samples Nos. 1, 15, 18, 20, 22, 24, and 37 are shown in FIGS. 2 to 8, respectively. In the tables, "Discharge Capacity" refers to the first discharge capacity, "Discharge Voltage" refers to the average voltage during the first discharge, "First Charge/Discharge Efficiency" refers to the rate of the first discharge capacity to the first charge capacity, and "Discharge Capacity Retention" refers to the rate of the 100th cycle discharge capacity to the first discharge capacity.

As is obvious from Tables 1 to 8 and FIGS. 2 to 8, as for samples Nos. 1 to 36 which are working examples, the discharge voltage and discharge capacity retention in each of the test cells for sodium-ion secondary batteries were 1.6 V or less and 72% or more, respectively, the discharge voltage and discharge capacity retention in each of the test cells for lithium-ion secondary batteries were 1.92 V or less and 94% or more, respectively, and these characteristics were excellent. On the other hand, as for samples Nos. 37 and 38 which are comparative examples, the discharge voltage and discharge capacity retention in each of the test cells for sodium-ion secondary batteries were 2.15 V or more and 69% or less, respectively, the discharge voltage and discharge capacity retention in each of the test cells for lithium-ion secondary batteries were 2.59 V or more and 69% or less, respectively, and these characteristics were poorer as compared to the working examples.

Secondary Battery Using Solid Electrolyte

Tables 9 and 10 show working examples (Nos. 39 to 43) of the present invention.

TABLE 9

| | | | 39 | 40 | 41 |
|---|---|---|---|---|---|
| Negative Electrode Material (% by mass) | | Negative-Electrode Active Material Precursor | 76 | 76 | 76 |
| | | $\beta''$-Alumina | 21 | 21 | — |
| | | Solid Electrolyte (Stabilizing Agent) | ($Li_2O$) | (MgO) | — |
| | | NASICON Crystal | — | — | 21 |
| | | Electrically Conductive Carbon | 3 | 3 | 3 |
| | | Solid Electrolyte | $Li_2O$-stabilized $\beta''$-alumina | MgO-stabilized $\beta''$-alumina | NASICON crystal |
| | | Crystallinity (% by mass) | 68 | 68 | 68 |
| | | Type of Precipitated Crystal | | $Na_5TiP_3O_{12}$ | |
| Battery Characteristics | | Discharge Capacity (mAh/g) | 59 | 60 | 53 |
| | | Discharge Voltage (V) | 1.24 | 1.22 | 1.29 |
| | | First Charge/Discharge Efficiency (%) | 97 | 98 | 92 |
| | | Discharge Capacity Retention (%) | 99 | 99.5 | 98 |

TABLE 10

| | | | 42 | 43 |
|---|---|---|---|---|
| Negative-Electrode Active Material Precursor Composition (% by mole) | | $Na_2O$ | 47.6 | 46.5 |
| | | $TiO_2$ | 19 | 18.6 |
| | | $P_2O_5$ | 28.6 | 27.9 |
| | | $SiO_2$ | | 7 |
| | | $Al_2O_3$ | 4.8 | |
| Negative Electrode Material (% by mass) | | Negative-Electrode Active Material Precursor | 76 | 76 |
| | | Solid Electrolyte | 21 | 21 |
| | | Electrically Conductive Carbon | 3 | 3 |
| | | Solid Electrolyte | $Li_2O$-stabilized $\beta''$-alumina | $Li_2O$-stabilized $\beta''$-alumina |
| | | Firing Temperature (° C.) | 600 | 600 |
| | | Firing Time (hour) | 1 | 1 |
| Negative-Electrode Active Material | | Crystallinity (% by mass) | 81 | 88 |
| | | Type of Precipitated Crystal | $Na_4TiP_2O_9$ $Na_3Al_2(PO_4)_3$ | $Na_5TiP_3O_{12}$ |
| NIB Battery Characteristics | | Discharge Capacity (mAh/g) | 60 | 63 |
| | | Discharge Voltage (V) | 1.26 | 1.23 |
| | | First Charge/Discharge Efficiency (%) | 96 | 94 |
| | | Discharge Capacity Retention (%) | 99.9 | 99.8 |

(1) Preparation of Negative-Electrode Active Material Precursor Powder

In the case of Nos. 39 to 41, sodium metaphosphate (NaPO$_3$), titanium oxide (TiO$_2$), sodium carbonate (Na$_2$CO$_3$), and orthophosphoric acid (H$_3$PO$_4$) were used as raw materials, powders of these raw materials were formulated to give a composition of, in % by mole, 48.9% Na$_2$O, 19.6% TiO$_2$, and 31.5% P$_2$O$_5$, and the mixture was melted in an air atmosphere at 1250° C. for 45 minutes. In the case of Nos. 42 and 43, using various oxides, carbonates, and so on as raw materials, powders of the raw materials were formulated to give each composition shown in Table 10. Then, the mixture was melted in an air atmosphere at 1350° C. for 60 minutes. Thereafter, resultant molten glass was poured between a pair of rotating rollers and formed into a shape with rapid cooling, thus obtaining film-like glass having a thickness of 0.1 to 1 mm. This film-like glass was ground for five hours with a ball mill using a 20-mm diameter ZrO$_2$ ball and the ground product was passed through a resin-made sieve with 120-μm openings to obtain coarse glass powder having an average particle size of 3 to 15 μm. Furthermore, the coarse glass powder was ground, using ethanol as a grinding aid, for 80 hours with a ball mill using a 3-mm diameter ZrO$_2$ ball, thus obtaining glass powder (negative-electrode active material precursor powder) having an average particle size of 0.7 μm. As a result of XRD measurement, the glass powder was confirmed to be amorphous.

(2) Preparation of Sodium-Ion Conductive Solid Electrolyte (Li$_2$O-Stabilized β"-Alumina)

A Li$_2$O-stabilized β" alumina having a composition formula of Na$_{1.6}$Li$_{0.34}$Al$_{10.66}$O$_{17}$ (manufactured by Ionotec Ltd.) was processed by dry grinding to a thickness of 0.2 mm, thus obtaining a solid electrolyte sheet. Furthermore, solid electrolyte powder (having an average particle size of 13 μm) was separately prepared by grinding the obtained solid electrolyte sheet with a planetary ball mill and passing the ground product through a sieve with 10-μm openings.

(MgO-Stabilized β"-Alumina)

Sodium carbonate (Na$_2$CO$_3$), aluminum oxide (Al$_2$O$_3$), and magnesium oxide (MgO) were used as raw materials, powders of these raw materials were formulated to give a composition of, in % by mole, 13.0% Na$_2$O, 80.2% Al$_2$O$_3$, and 6.8% MgO, and the mixture was ground and mixed in ethanol for 10 hours with a ball mill using a 5-mm diameter Al$_2$O$_3$ ball. The obtained powder was formed into a 0.2-mm thick sheet, then isostatically pressed at a pressure of 40 MPa, and heat-treated in an air atmosphere at 1640° C. for an hour to obtain a solid electrolyte sheet made of MgO-stabilized β" alumina.

Furthermore, solid electrolyte powder (having an average particle size of 12 μm) was separately prepared by grinding the obtained solid electrolyte sheet with a planetary ball mill and passing the ground product through a sieve with 10-μm openings. When the powder X-ray diffraction pattern of the obtained solid electrolyte powder was checked, diffraction lines originating from ((Al$_{10.32}$Mg$_{0.68}$O$_{16}$) (Na$_{1.68}$O)) which is a trigonal crystal belonging to space group R-3m were confirmed.

(NASICON Crystal)

Sodium metaphosphate (NaPO$_3$), yttria-stabilized zirconia ((ZrO$_2$)$_{0.97}$ (Y$_2$O$_3$)$_{0.03}$), sodium carbonate (Na$_2$CO$_3$), and silicon oxide (SiO$_2$) were used as raw materials, powders of these raw materials were formulated to give a composition of, in % by mole, 25.3% Na$_2$O, 31.6% ZrO$_2$, 1.0% Y$_2$O$_3$, 8.4% P$_2$O$_5$, and 33.7% SiO$_2$, and the mixture was ground and mixed in ethanol for 10 hours with a ball mill using a 5-mm diameter Al$_2$O$_3$ ball in ethanol. The obtained powder was formed into a 0.2-mm thick sheet, then isostatically pressed at a pressure of 40 MPa, and heat-treated in an air atmosphere at 1250° C. for two hours to obtain a solid electrolyte sheet made of NASICON crystal.

Furthermore, solid electrolyte powder (having an average particle size of 12 μm) was separately prepared by grinding the obtained solid electrolyte sheet with a planetary ball mill and passing the ground product through a sieve with 10-μm openings. When the powder X-ray diffraction pattern of the solid electrolyte crystal was checked, diffraction lines originating from (Na$_{3.05}$Zr$_2$Si$_{2.05}$P$_{0.95}$O$_{12}$) which is a trigonal crystal belonging to space group R-3c were confirmed.

(3) Production of Solid-State Sodium-Ion Secondary Battery

The negative-electrode active material precursor powder and solid electrolyte powder obtained in the above manners, and acetylene black (SUPER C65 manufactured by TIMICAL) as electrically conductive carbon were weighed in each ratio described in Tables 9 and 10 and mixed at 300 rpm for 30 minutes using a planetary ball mill. Added to 100 parts by mass of the obtained mixture powder were 10 parts by mass of polypropylene carbonate (manufactured by Sumitomo Seika Chemicals Co., Ltd.) and additionally 30 parts by mass of N-methylpyrrolidinone. The mixture was stirred well with a planetary centrifugal mixer to form a slurry.

The obtained slurry was applied, with an area of 1 cm$^2$ and a thickness of 80 μm, to one side of the solid electrolyte sheet described in Tables 9 and 10 and then dried at 70° C. for three hours. Next, the product was put into a carbon container and fired in a nitrogen atmosphere at 600° C. for an hour to crystallize the negative-electrode active material precursor powder, thus forming a negative electrode layer. All the above operations were conducted in an environment at a temperature of the dew point minus 50° C. or below.

When the powder X-ray diffraction patterns of the materials making up the negative electrode layer were checked, diffraction lines originating from a Na$_5$Ti(PO$_4$)$_3$ crystal were confirmed as for Nos. 39 to 41 and diffraction lines originating from the crystals described in Table 10 were confirmed as for Nos. 42 and 43. Regarding all the negative electrodes, respective crystalline diffraction lines originating from the solid electrolyte powders used were confirmed.

Next, a current collector formed of a 300-nm thick gold electrode was formed on the surface of the negative electrode layer using a sputtering device (SC-701AT manufactured by Sanyu Electron Co., Ltd.). Furthermore, in an argon atmosphere at a temperature of the dew point minus 70° C. or below, metallic sodium serving as a counter electrode was pressure-bonded to the surface of the solid electrolyte layer opposite to the surface thereof on which the negative electrode layer was formed. The obtained laminate was placed on a lower lid of a coin cell and covered with an upper lid to produce a CR2032-type test cell.

(4) Charge and Discharge Test

The produced test cell was CC (constant-current) charged at 60° C. from an open circuit voltage to 0.7 V and its amount of electricity charged to the negative-electrode active material per unit mass (first charge capacity) was determined. Next, the test cell was CC discharged from 0.7 V to 2.5 V and its amount of electricity discharged from the negative-electrode active material per unit mass (first discharge capacity) was determined. In this test, the C rate was 0.01 C and "Discharge Capacity Retention" was evaluated as a rate of the 10th cycle discharge capacity to the first discharge capacity. The results are shown in Tables 9 and 10.

As is obvious from Tables 9 and 10, as for samples Nos. 39 to 43, the discharge voltage and the discharge capacity retention were 1.29 V or less and 98% or more, respectively, and these characteristics were excellent.

INDUSTRIAL APPLICABILITY

The negative-electrode active material for electricity storage devices according to the present invention is suitable for electricity storage devices used in portable electronic devices, electric vehicles, electric power tools, backup emergency power supplies, and so on.

The invention claimed is:

1. A negative-electrode active material for electricity storage devices, the negative-electrode active material containing a crystalline phase represented by a general formula $R_{x1}R'_{x2}MA_yO_z$ (where R represents at least one selected from Li, Na, and K, R' represents at least one selected from Mg, Ca, Sr, Ba, and Zn, M represents at least one selected from Ti, V, and Nb, A represents at least one selected from P, Si, B, and Al, $2 \leq x1 \leq 6$, $0 \leq x2 \leq 6$, $0 < y \leq 12$, and $0.2 \leq z \leq 87$).

2. A negative-electrode active material for electricity storage devices, the negative-electrode active material containing a crystalline phase represented by a general formula $R_xTiP_yO_z$ (where R represents at least one selected from Li, Na, and K, $2 \leq x \leq 6$, $0.25 \leq y \leq 4$, and $2.5 \leq z \leq 16$).

3. The negative-electrode active material for electricity storage devices according to claim 2, wherein the crystalline phase represented by the general formula $R_xTiP_yO_z$ is at least one selected from $R_4TiP_2O_9$, $R_5TiP_3O_{12}$, $R_3TiP_2O_{8.5}$, $R_{3.91}TiP_2O_9$, and $R_2TiP_2O_8$.

4. The negative-electrode active material for electricity storage devices according to claim 1, wherein the negative-electrode active material is formed of a composition containing, in terms of % by mole of oxide, 0 to 70% $R_2O$, 0 to 70% $R'O$, 1 to 80% $TiO_2+V_2O_5+Nb_2O_5$, and 5 to 70% $P_2O_5+SiO_2+B_2O_3+Al_2O_3$.

5. The negative-electrode active material for electricity storage devices according to claim 1, wherein a content of the crystalline phase is 50% by mass or more.

6. The negative-electrode active material for electricity storage devices according to claim 1, wherein the negative-electrode active material is for use in a sodium-ion secondary battery.

7. A negative electrode material for electricity storage devices containing the negative-electrode active material for electricity storage devices according to claim 1.

8. A negative-electrode active material for electricity storage devices, the negative-electrode active material containing a crystalline phase represented by a general formula at least one selected from $R_4TiP_2O_9$, $R_5TiP_3O_{12}$, $R_3TiP_2O_{8.5}$, $R_{3.91}TiP_2O_9$, $RTiP_{1.67}O_{6.67}$, $R_2TiP_2O_8$, $RTiP_{1.5}O_6$ (where R represents at least one selected from Li, Na, and K), $NaTiPO_5$, and $KTiPO_5$.

9. The negative-electrode active material for electricity storage devices according to claim 2, wherein a content of the crystalline phase is 50% by mass or more.

10. The negative-electrode active material for electricity storage devices according to claim 2, wherein the negative-electrode active material is for use in a sodium-ion secondary battery.

11. A negative electrode material for electricity storage devices containing the negative-electrode active material for electricity storage devices according to claim 2.

12. The negative-electrode active material for electricity storage devices according to claim 8, wherein a content of the crystalline phase is 50% by mass or more.

13. The negative-electrode active material for electricity storage devices according to claim 8, wherein the negative-electrode active material is for use in a sodium-ion secondary battery.

14. A negative electrode material for electricity storage devices containing the negative-electrode active material for electricity storage devices according to claim 8.

* * * * *